US011163616B2

(12) United States Patent
Wester

(10) Patent No.: US 11,163,616 B2
(45) Date of Patent: Nov. 2, 2021

(54) SYSTEMS AND METHODS FOR ENABLING INTEROPERATION OF INDEPENDENT SOFTWARE APPLICATIONS

(71) Applicant: Polyjuice AB, Stockholm (SE)

(72) Inventor: Joachim Wester, Vaxholm (SE)

(73) Assignee: Polyjuice AB, Stockholm (SE)

(*) Notice: Subject to any disclaimer, the term of this patent is extended or adjusted under 35 U.S.C. 154(b) by 51 days.

(21) Appl. No.: 15/914,631

(22) Filed: Mar. 7, 2018

(65) Prior Publication Data

US 2018/0260258 A1    Sep. 13, 2018

Related U.S. Application Data

(60) Provisional application No. 62/468,401, filed on Mar. 8, 2017, provisional application No. 62/468,225, filed on Mar. 7, 2017.

(51) Int. Cl.
| | | |
|---|---|---|
| *G06F 9/54* | (2006.01) | |
| *G06F 16/21* | (2019.01) | |
| *G06F 16/25* | (2019.01) | |

(52) U.S. Cl.
CPC .............. *G06F 9/541* (2013.01); *G06F 9/548* (2013.01); *G06F 16/211* (2019.01); *G06F 16/252* (2019.01); *G06F 16/258* (2019.01)

(58) Field of Classification Search
CPC ............................... G06F 9/541; G06F 16/211
See application file for complete search history.

(56) References Cited

U.S. PATENT DOCUMENTS

| | | | |
|---|---|---|---|
| 5,295,256 A | 3/1994 | Bapat | |
| 5,873,093 A | 2/1999 | Williamson et al. | |

(Continued)

FOREIGN PATENT DOCUMENTS

| | | | |
|---|---|---|---|
| EP | 0459683 A2 | 12/1991 | |
| EP | 2483805 A1 | 8/2012 | |

(Continued)

OTHER PUBLICATIONS

Millard, B. et al., Run-Time Support and Storage Management for Memory-Mapped Persistent Objects, Proceedings of the International Conference on Distributed Computing Systems, Pittsburgh, May 25-28, 1993, Los Alamitos, IEEE Comp. Soc. Press, US, vol. 13, pp. 508-515, 1993, 8 pages.

(Continued)

*Primary Examiner* — Douglas B Blair
(74) *Attorney, Agent, or Firm* — Kilpatrick Townsend & Stockton LLP

(57) ABSTRACT

One example method includes executing, by one or more processors of a computer system, an execution environment, the computer system comprising the one or more processors and a processor-addressable memory in communication with the one or more processors; maintaining, by the computer system, a data store memory; receiving first translation information for a first application and second translation information for a second application, the first translation information defining a first mapping relationship between a first derived data item and a first fundamental data item, and the second translation information defining a second mapping relationship between a second derived data item and the first fundamental data item, the first and second derived data items formatted according to data models of the first and second application, respectively; receiving input request information about an input request targeting the first application for a first user interface, the input request associated with the first derived data item; generating a complementary request for a second user interface using at least the input request information and the first and second mapping relationship, the complementary request associated with the second derived data item; providing the complementary request to the second application; and outputting the first user interface and the second user interface.

20 Claims, 16 Drawing Sheets

(56) References Cited

U.S. PATENT DOCUMENTS

| | | |
|---|---|---|
| 5,937,409 A | 8/1999 | Wetherbee |
| 6,047,284 A | 4/2000 | Owens et al. |
| 6,253,226 B1 | 6/2001 | Chidambaran et al. |
| 6,314,417 B1 | 11/2001 | Bennett et al. |
| 6,711,595 B1 | 3/2004 | Anantharao |
| 7,143,087 B2 | 11/2006 | Fairweather |
| 7,210,013 B2 | 4/2007 | Itoh et al. |
| 7,222,117 B1 | 5/2007 | McGrogan |
| 8,161,006 B2 | 4/2012 | Kamamura |
| 8,266,125 B2 | 9/2012 | Wester et al. |
| 8,856,092 B2 | 10/2014 | Wester et al. |
| 9,280,529 B2 * | 3/2016 | Lemonik ................ H04L 67/10 |
| 9,667,676 B1 * | 5/2017 | Lo ........................ H04L 65/403 |
| 9,690,810 B2 | 6/2017 | Wester et al. |
| 9,953,018 B2 * | 4/2018 | Keslin .................. G06Q 10/101 |
| 2005/0187980 A1 | 8/2005 | Carlin et al. |
| 2006/0095332 A1 | 5/2006 | Riemann et al. |
| 2006/0248198 A1 * | 11/2006 | Galchev ............. G06F 11/1438 709/227 |
| 2009/0015628 A1 | 6/2009 | Arthursson et al. |
| 2010/0122184 A1 * | 5/2010 | Vonog .................. G06F 3/0486 715/753 |
| 2011/0125823 A1 * | 5/2011 | Macken ................ G06F 9/542 709/201 |
| 2011/0125834 A1 * | 5/2011 | Macken .................... G06F 8/61 709/203 |
| 2011/0125854 A1 * | 5/2011 | Macken ................ H04L 67/34 709/206 |
| 2011/0126134 A1 * | 5/2011 | Macken ................ H04L 67/02 715/760 |
| 2011/0126213 A1 * | 5/2011 | Macken .................... G06F 9/54 719/313 |
| 2011/0145532 A1 | 6/2011 | Deguchi et al. |
| 2013/0091332 A1 * | 4/2013 | Vankov .................. G06F 9/544 711/153 |
| 2016/0239681 A1 * | 8/2016 | Plattner ................ G06F 16/256 |
| 2017/0374180 A1 * | 12/2017 | Gowda ................... H04L 69/16 |

FOREIGN PATENT DOCUMENTS

| | | |
|---|---|---|
| WO | 95/03586 A1 | 2/1995 |
| WO | 99/17232 A1 | 4/1999 |
| WO | 02/37335 A2 | 5/2002 |
| WO | 2011/038770 A1 | 4/2011 |

OTHER PUBLICATIONS

International Search Report and Written Opinion, International Application No. PCT/EP2009/062784, dated Dec. 2, 2009.

* cited by examiner

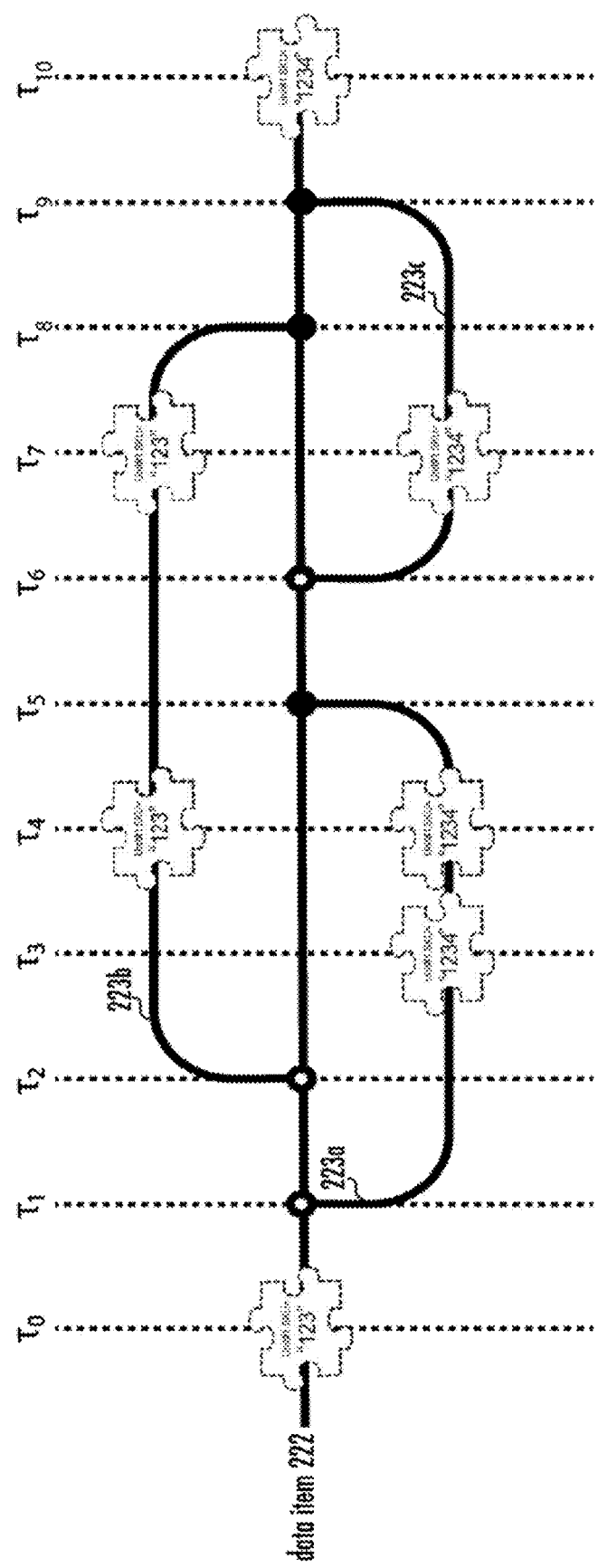

SYSTEMS AND METHODS FOR ENABLING INTEROPERATION OF INDEPENDENT SOFTWARE APPLICATIONS

CROSS-REFERENCE TO RELATED APPLICATIONS

This application claims priority to U.S. Provisional Patent Application No. 62/468,401, entitled "Systems and Methods for Enabling Interoperation of Independent Software Applications," filed Mar. 8, 2017, and U.S. Provisional Patent Application No. 62/468,225, entitled "Systems and Methods for Enabling Interoperation of Independent Software Applications," filed Mar. 7, 2017, the entirety of both of which are hereby incorporated by reference for all purposes.

STATEMENT OF GOVERNMENTAL FUNDING

The project leading to this application has received funding from the European Union's Horizon 2020 research and innovation programme under grant agreement No. 784399.

FIELD

The present application generally relates to databases and more specifically relates to systems and methods for enabling interoperation of independent software applications.

BACKGROUND

It is not uncommon for large enterprises to use hundreds of business software applications from different vendors, each dealing with business information relating to the enterprise. To share data, applications may include application programming interfaces (each an "API") to allow one application to send messages to, or receive messages from, another application. Alternatively, applications may be designed to use a common data model. However, both approaches require vendors to agree upon APIs or data models before the applications are developed. This is sometimes not possible as applications, APIs and data models might be developed in parallel by different vendors having no knowledge of each other. Thus it is at great cost that the industry needs to employ software engineers to provide software integration services.

SUMMARY

Various examples are described for systems and methods for enabling interoperation of independent software applications. For example, one example method includes executing, by one or more processors of a computer system, an execution environment, the computer system comprising the one or more processors and a processor-addressable memory in communication with the one or more processors; maintaining, by the computer system, a data store memory; receiving first translation information for a first application and second translation information for a second application, the first translation information defining a first mapping relationship between a first derived data item and a first fundamental data item, and the second translation information defining a second mapping relationship between a second derived data item and the first fundamental data item, the first and second derived data items formatted according to data models of the first and second application, respectively; receiving input request information about an input request targeting the first application for a first user interface, the input request associated with the first derived data item; generating a complementary request for a second user interface using at least the input request information and the first and second mapping relationship, the complementary request associated with the second derived data item; providing the complementary request to the second application; and outputting the first user interface and the second user interface.

Another example method includes receiving translation information; receiving one or more initial request notifications; proceeding, starting with the initial request notifications as input notifications, to obtain additional request notifications in a recursive manner, with the additional request notifications acting as the input notifications for a next iteration, until no more additional request notifications are obtained; wherein the obtaining of additional requests comprises: obtaining additional requests by generating complementary requests, and obtaining application induced requests, wherein the generation of complementary requests comprises: finding related data items having mapping relationships with data items associated with the requests pertaining to the input notifications, and generating additional requests for user interfaces associated with the related data items, the additional requests targeting applications associated with the related data items, wherein the obtaining of application induced requests comprises: receiving information about user interface requests generated by applications during the handling of requests pertaining of the input notifications; and issuing at least some of the complementary requests to targeted applications.

In addition, examples of systems and computer-readable medium comprising processor-executable instructions to cause a processor to execute these and other example methods are described herein.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 2 shows an example modification of a data item in different interaction scopes;

DETAILED DESCRIPTION

Figure 1A:
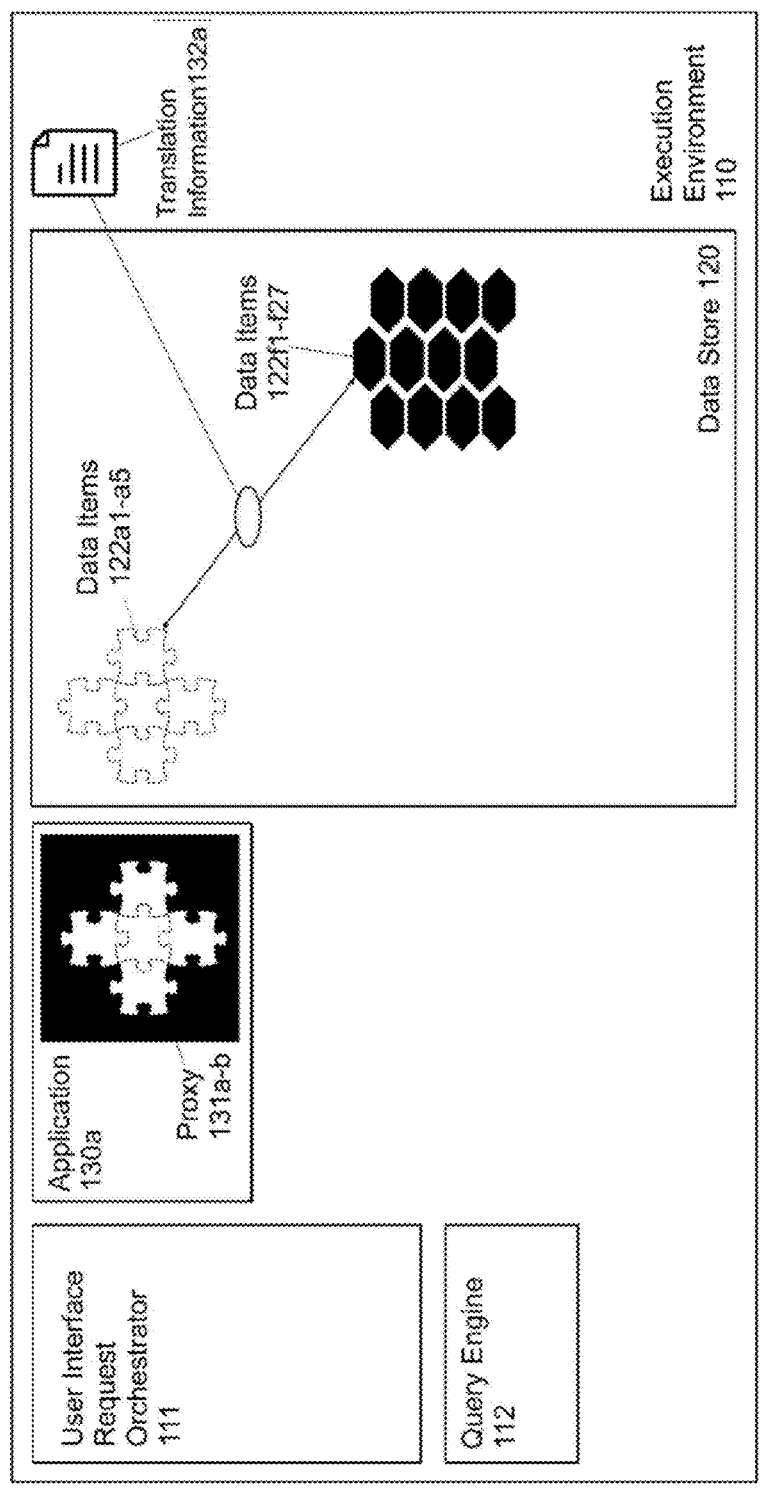
FIG. 1a shows an example system for enabling interoperation of independent software applications.
Figure 1B:
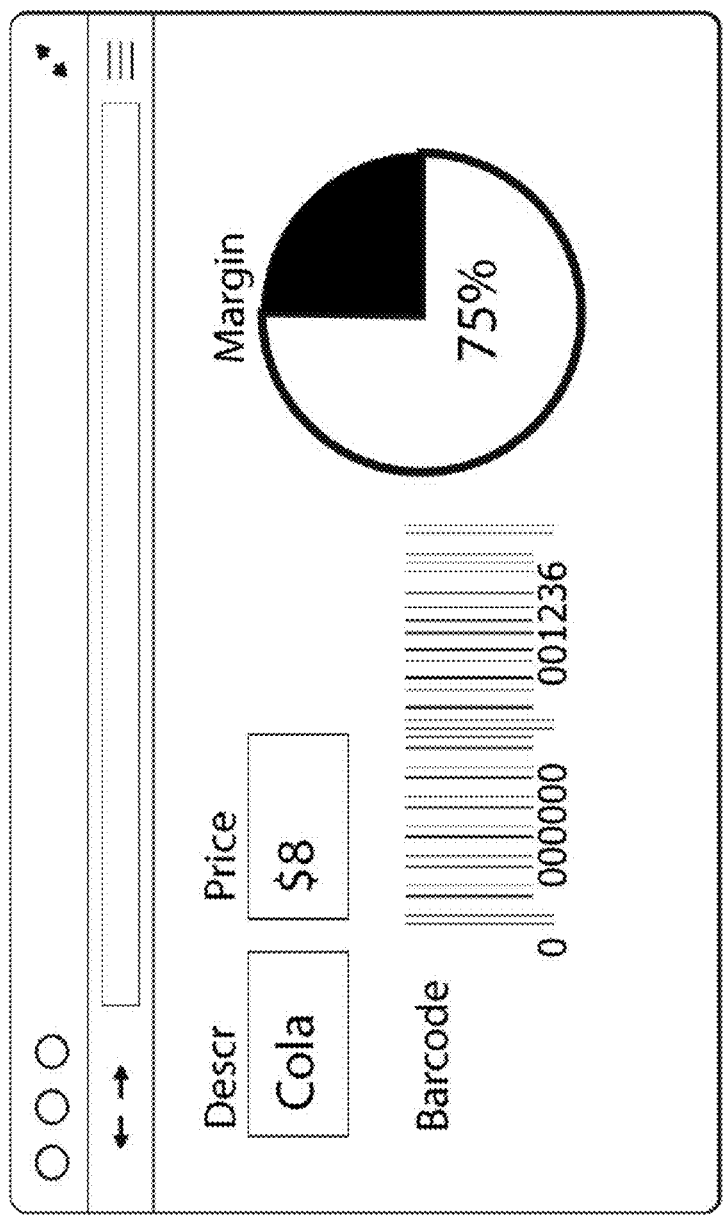
FIG. 1b shows an example graphical user interface ("GUI") for a first software application.

Examples are described herein in the context of systems and methods for enabling interoperation of independent software applications. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Referring now to FIGS. 1a through 1g, the figures show an illustrative example of an execution environment according to this disclosure. The example is given in the context of a person who manages a grocery store. The grocery store manager may use a variety of different applications to manage her store. For example, she might use a procurement application to buy products, a point-of-sale application to manage her store products and a contact management application to manage customers and suppliers.

Referring now to FIGS. 1a through 1g. A point-of-sale application 130a has been developed by a Tokyo based software vendor. A procurement application 130b has concurrently been developed by a Stockholm based software vendor. A contact management application 130c has been developed by a New York based vendor. The three vendors were not aware of each other, and their software applications are based on very different data models and are not exposing any APIs for the other vendors to make use of.

The user is running an execution environment 110 on a server. The execution environment 110 includes a data store 120, as well as related processes, including a user interface request orchestrator 111 and a query engine 112. The data store 120 maintains a number of fundamental data items 122f1-f27 within its memory. Fundamental data items will be defined in more detail below, but in general are data items that are not computed from any other data item.

The user begins by installing the point-of-sale application 130a on the server by installing an executable binary file and a separate text file containing translation information 132a, as may be seen in FIG. 1a. The translation information 132a contains directives to the execution environment 110 describing how to translate changes made to the application-specific data items into changes in fundamental data items 122f1-f27 and how to derive application-specific product information data items 122a1-a5 from the fundamental data items 122f1-f27.

To access the point-of-sale application 130a, the user launches her web browser and accesses the server. She is then presented with links to pages within the application 130a. When she navigates to a product GUI page, shown in FIG. 1b, she is presented with a user interface to enable her to view and edit information related to that specific product.

Figure 1C:
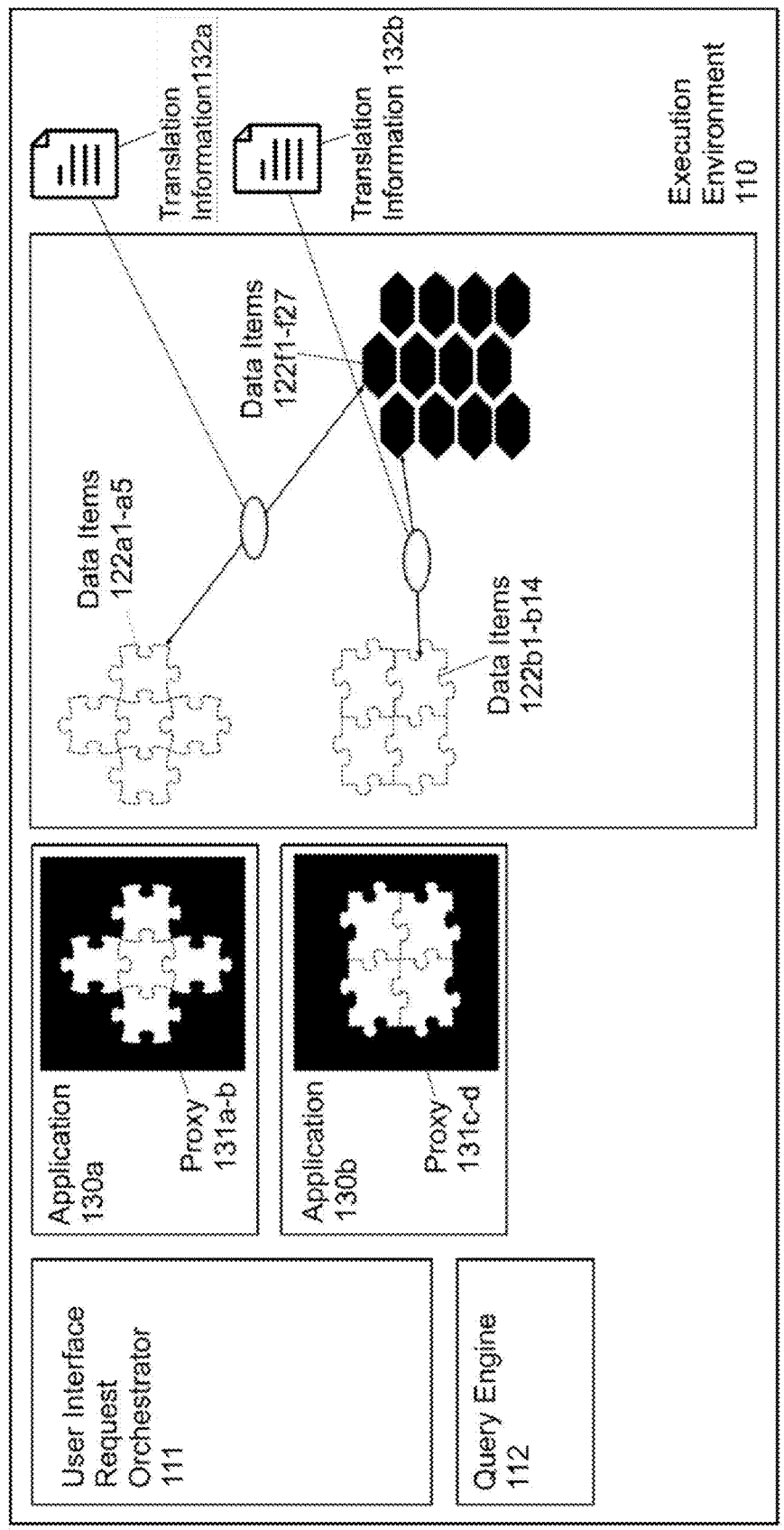
FIG. 1c shows the example system of FIG. 1a for enabling interoperation of independent software applications with an additional software application.
Figure 1D:
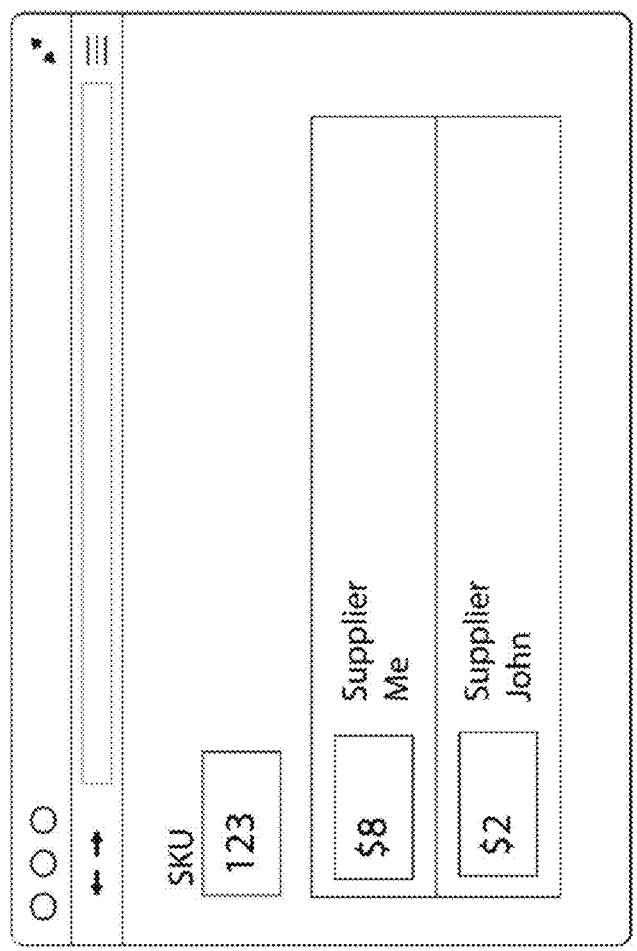
FIG. 1d shows an example GUI for a second software application.
Figure 1E:
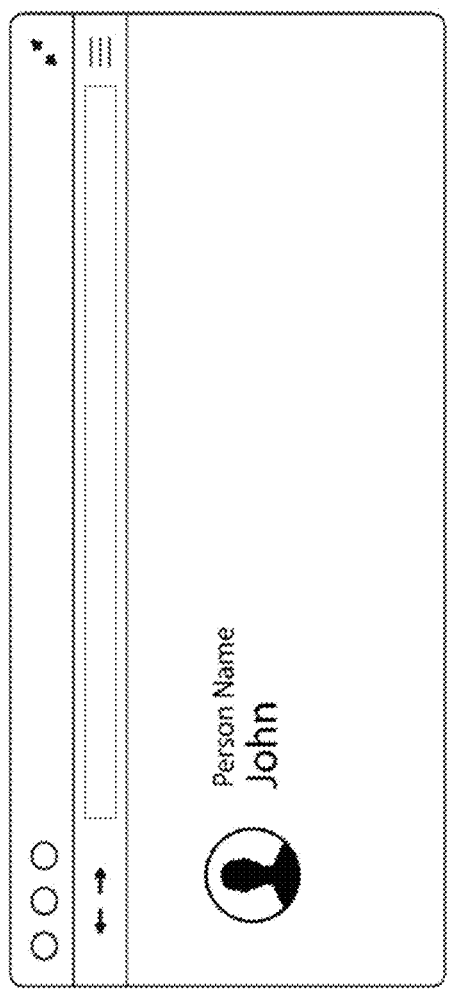
FIG. 1e shows an example GUI for a third software application.

The user then installs the procurement application 130b by installing an executable binary file and a separate text file containing translation information 132b, as may be seen in FIG. 1c. Similar to translation information 132a, the translation information 132b contains directives to the execution environment 110 describing how to derive application-specific "Unit", "Supply" and "Supplier" data items from fundamental "Vendible", "Price" and "Agent" data items and how to translate changes made to the application-specific data items into changes in the fundamental data items.

After installing the procurement application 130b, the user navigates to the same URL as before. Using translation information 132a-b, the execution environment 110 combines the GUI elements and information from the procurement application's 130b stand-alone GUI page, shown in FIG. 1d, with the stand-alone GUI page of the point-of-sales application 130a, shown in FIG. 1b, to create a single combined GUI page, shown in FIG. 1g, that includes visual elements from both the product information management application 130a and the point-of-sale application 130b.

Figure 1F:
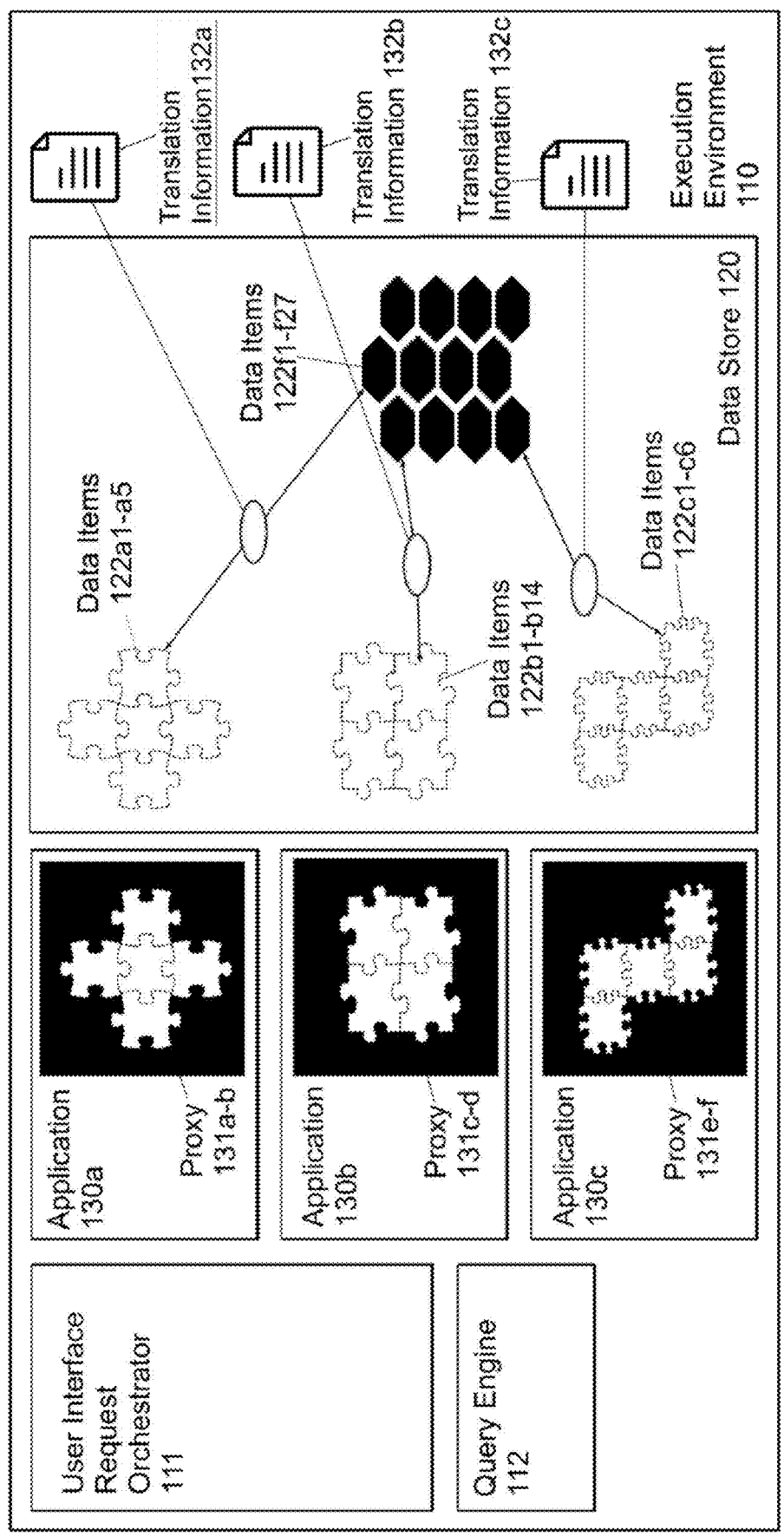
FIG. 1f shows the example system of FIG. 1a for enabling interoperation of independent software applications with a third software application.
Figure 1G:
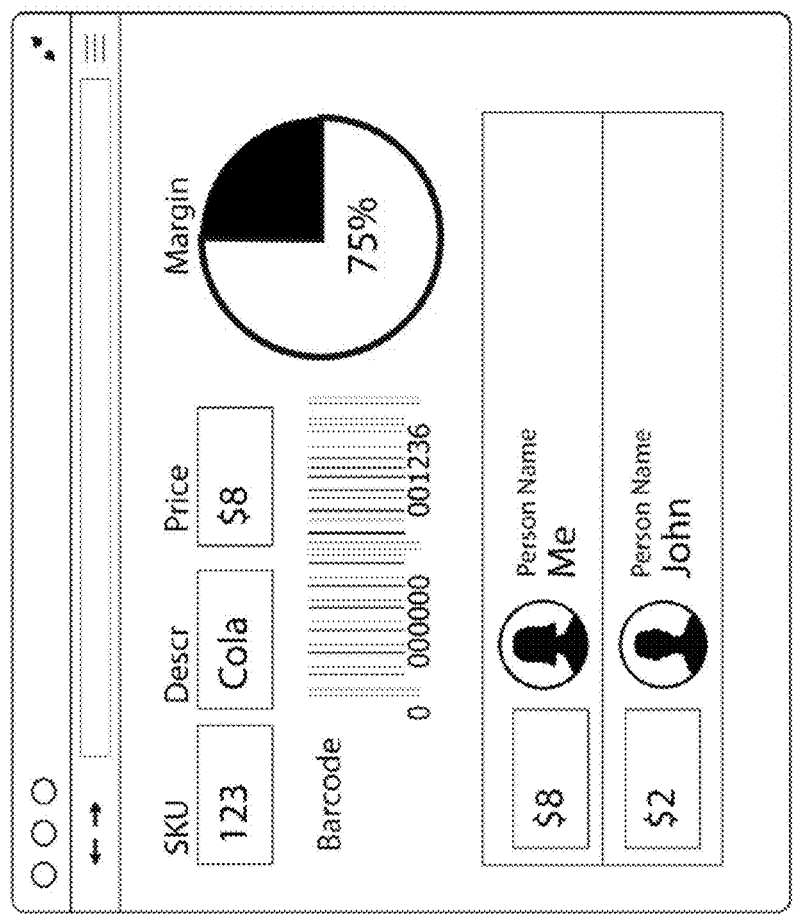
FIG. 1g shows an example combined GUI based on the GUIs of the first, second, and third software applications.

The user then interacts with the combined GUI page, shown in FIG. 1g, by changing the "SKU" field as though she were interacting with a single application, unaware that multiple different applications are involved in the combined GUI. In this example, as she types a new value, the rendered "Barcode" updates in real time keystroke for keystroke based on the new value. To enable this real-time update, the combined UI communicates the changes to the execution environment, which propagates the changes to the fundamental data items, and to any affected derived data items, which information is then provided back to the combined GUI. Thus, it appears to the user as though she were interacting with a single application.

Because the translation information 132a-c in this example are provided as human-readable text files and because the applications are not aware of any translation information, they can be freely edited to provide desired behavior. Should the user be dissatisfied with how the applications interact, she can substitute her own translation information in place of the translation information 132a-c provided with one or more of the applications. This way, the user can change how the applications share data, or how their UIs are combined, without altering the applications themselves.

This illustrative example is given to introduce the reader to the general subject matter discussed herein and the disclosure is not limited to this example. The following sections describe various additional non-limiting examples and examples of systems and methods for enabling interoperation of independent software applications.

In general, the embodiments described here can be performed by a computer system comprising a single computing device, or a set of computing devices that are interconnected by one or more communication networks. In one example, the computer system comprises a web server computer providing web application services to remote client devices through a variety of web applications. Each remote client can log into the web server appliance and run one or more of the web applications via a web browser. Thus, the web applications are executed locally on the web server appliance, with certain information, such as a user interface provided to the user via the web browser.

Execution Environment

Examples according to the present disclosure may be provided in the form of an execution environment that may be executed by one or more processors of a computer system. An execution environment provides an environment in which one or more applications may execute and access resources of the underlying computer system through the execution environment.

In the above example, shown in FIG. 1f, an execution environment 110 includes a transactional in-memory data store 120, a query engine 112, and an user interface request orchestrator 111. It should be appreciated that in some embodiments, however, the execution environment 110 may include only a subset of such features or may be provided as separate modules providing these features.

In this example, the user interface request orchestrator 111 uses translation information 132a-c to translate requests for a user interface into complementary requests for user interfaces from applications 130a-c to provide a combined user interface. The data store 120 similarly uses translation information 132a-c to derive data items such as 122a1-a5 from fundamental data items 122f1-f27, and to propagate changes made to derived data items back to the appropriate fundamental data items, and, if appropriate, to other derived data items based on the information contained within the translation information 130a-c. The query engine 112 receives queries to the data store 120 and obtains data items matching the queries, which may be either derived or fundamental data items. In this example, the applications 130a-c are executed by the execution environment 110, which maintains process isolation for each application 130a-c from the other applications 130a-c. "Process isolation" refers to each application having its own memory space for its program code and local data, e.g., its heap, that is not normally accessible by other applications executed by the execution environment. If an application attempts to access memory outside of its own memory space it will result in an error, such as a segmentation fault. However, some embodiments may not enforce process isolation between applications. For example, all applications may be executed in a single process in some embodiments.

Data Items and the Data Store

Examples of execution environments according to this disclosure may provide a data store that can maintain data items and provide them in response to requests from applications. The term "data item" within this application refers to data that is defined within the data store, either as a "fundamental" data item or as a "derived" data item. It should be appreciated that "defined within the data store" does not mean that a data item's value is necessarily physically stored within the data store memory. The description below explains the types of data items and when data items may be "materialized" within a data store.

A fundamental data item is a data item that is materialized within the memory of the data store and whose value is not computed from values of other data items. In contrast, a "derived" data item is a data item whose value is computed from values of fundamental data items, whether directly or indirectly, e.g., a derived data item's value may be computed from the value of further derived data items, so long as all indirectly derived data items are ultimately computed from one or more fundamental data items. Derived data items may be materialized within the data store in some embodiments, but materialization of derived data items is not required. Instead, the computation of the value of a derived data item may be deferred until the derived data item is accessed.

In order for the data store to be able to compute the values of derived data items, whether materialized or not, the data store has access to translation information defining the computation rules. Such information will be discussed in more detail with respect to the description of "translation information" later in this disclosure.

Figure 1H:
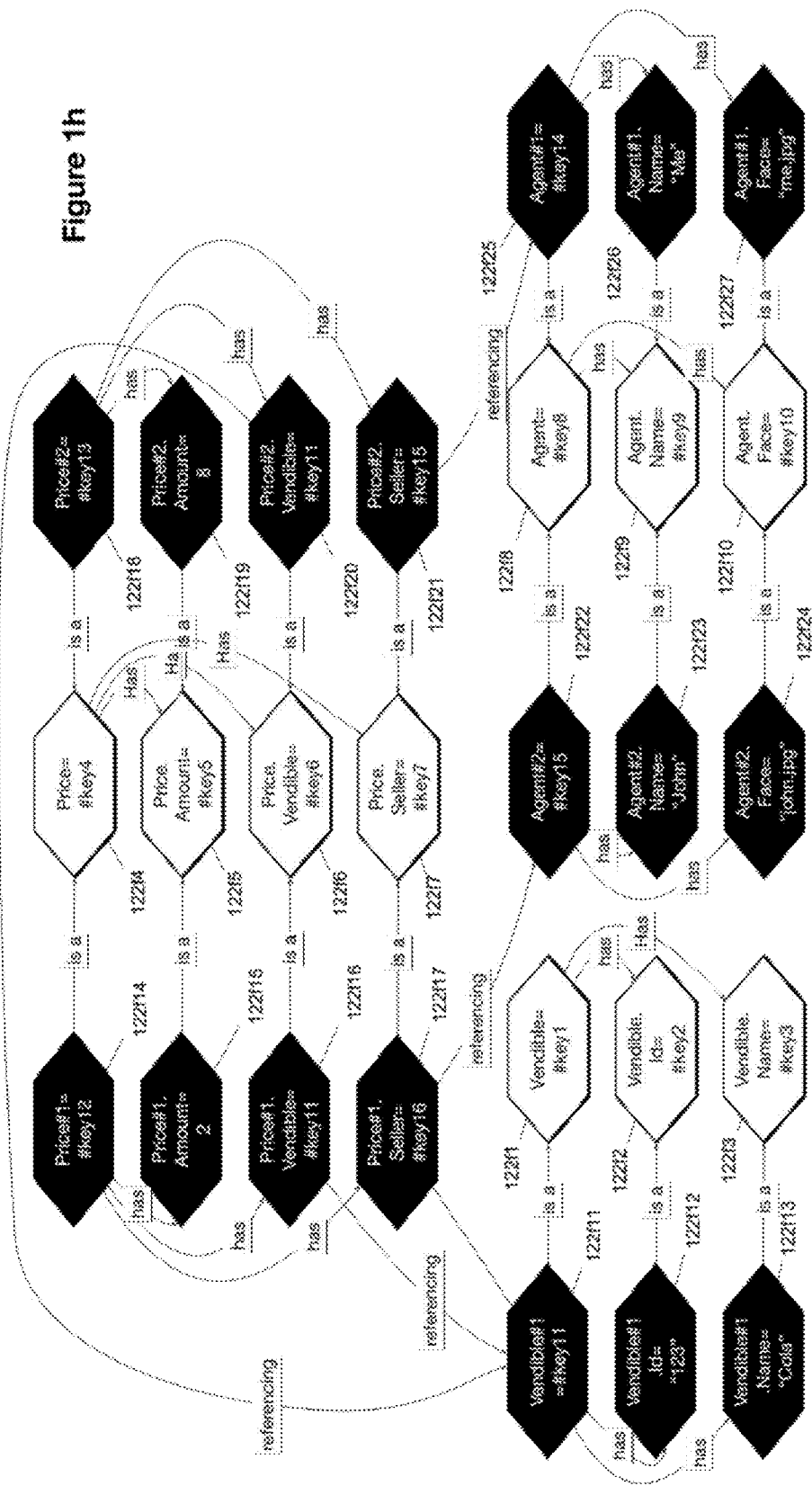
FIG. 1h shows example data model defining data items stored in a data store in one example of a system for enabling interoperation of independent software applications.

Referring now to FIG. 1h, FIG. 1h shows fundamental data items. The data item 122f11 represents a "Vendible" item having the name "Cola" stored in data item 122f13. The data item 122f12 represents the "Id" property instance of the Cola vendible 122f11, having the value "123". Data item 122f1 represents the type of instance data item 122f11, and data item 122f2 represents the property type of property instance data item 122f12. Thus, from the figure it can be seen that types, instances, property types and property instances may all be data items.

In a relational setting, the term "type" may refer to a table, "instance" may refer to a row, "property type" may refer to a column, and "property instance" may refer to the value of a given row and column (i.e., "cell"). Similarly, in an object-oriented setting, "type" may refer to a class, "instance" may refer to a class instance, "property" may refer to a field of a class, and "property value" may refer to the value of a field in an instance.

In a graph database setting, nodes, edges and their respective attributes may be data items. Similarly, in a key/value setting, such as a document store, key/value pairs may be data items. However, the values may further constitute data items. For example, if the values are represented as JSON objects, the individual attributes of the object may also be data items, and so on. It should be apparent from FIG. 1h how different paradigms could represent the data items corresponding to the Cola vendible and its properties.

While the examples above were written in the context of the relational and graph database paradigms, some embodiments according to this disclosure may use any suitable representation paradigm.

While FIG. 1h shows data items with primitive values, further value representations are contemplated by the scope of this disclosure. For example, in addition to primitive values like strings, numbers and keys, the value of a data item may also be, for example, a bitmap, vector, or more complex data structure.

The above example is provided for illustrative purposes only. In more complete examples, the fundamental data items may be formatted according to a data model with greater level of detail and a higher degree of normalization. As applications typically access derived data items rather than fundamental data items, the method allows for the fundamental data items to be formatted in an arbitrarily complex and expressive model as it does not affect the authoring of the application source or the complexity of the application.

Interaction Scopes

The execution environment 110 may provide applications, such as 130*a-c*, access to the data store 120. Examples of data store access may include operations like creating, reading, querying, updating and deleting data items. In some embodiments, such access may occur within an isolated context. For example, changes made in a form or document might be visible to a single user or a group of users while being invisible to other users until the user who made the changes hits a save button. However, in some embodiments, access may instead be without isolation. In such cases, changes in a form or document might be visible to all other users as soon as they are made. Providing read or write access to data involves creating an "interaction scope", whether implicitly or explicitly. That is, the interaction scope is the context within which data items are read from or written to. Thus, any time an application accesses data, the access is within an interaction scope, irrespective of whether an explicit interaction scope is created. For example, the provision of read or write access without isolation is referred to as providing a global or "non-isolated" interaction scope herein, whereas the provision of isolated access is referred to as providing isolated interaction scopes, where each isolated interaction scope provides access to the data store 120 within an isolated context. It should be appreciated that an interaction scope does not imply that any particular features are invoked, such as concurrency controls, etc. Instead, interaction scope occurs when data items are accessed, irrespective of how that access is accomplished. Isolated and non-isolated interaction scopes will be described in greater detail below.

It should be appreciated that, in some embodiments, certain interaction scopes may provide read, but not write, access to the data store 120.

Interoperation of Independent Software Applications

Software applications, in general, often have different or incompatible data models, such as different data schemas or different interpretations of data items represented according to a data schema. That is, an application may be designed to operate solely on data items formatted according to its own application-specific data model. In such cases, one application may not be able to access or interpret data items represented according to another application's data model. However, although the applications' data models may differ significantly, there often exist semantic similarities or areas of overlap between different applications' data models. For example, many enterprise software applications provide or consume information about customers and products, though they often represent this information according to different data models.

Furthermore, each autonomous software application generally features its own user interface, separate from the user interfaces of other autonomous applications. For example, a typical contact management application may have a user interface that includes scaffolding like menus and toolbars, as well as pages designed for carrying out particular tasks. Thus, even to the extent that such applications are able to share data, a user may need to interact with several independent application user interfaces to get a complete view of a piece of information, or to complete a particular task. For example, a user might have to check an inventory application about the quantity in stock for a particular product and a product information management system for commercial images relating to the same product.

Methods according to this disclosure may allow independently developed, autonomous applications to share data and present a combined user interface without requiring them to be written using a shared data model or a shared user interface. This may be facilitated by providing "translation information" to the execution environment 110 for each application. The translation information may, in some embodiments, allow the execution environment 110 to map the incompatible data models of each application to a shared data model. Translation information may, again in some embodiments, further allow the execution environment 110 to combine the applications' user interfaces into a combined user interface. For example, when a user navigates to a user interface representing a contact person, the user interfaces from multiple applications relating to that person are combined into a single page or screen.

Referring again to FIG. 1*f*, FIG. 1*f* shows an example of translation information 132*a-c* provided to the execution environment 110 for applications 130*a-c*. In this example, translation information is provided separately from the applications in the form of text files. Thus, in this example, the translation information can be modified without altering the applications themselves. This may allow an application to be sealed and compiled into a read only unit such as an executable file or a package from a package manager.

Furthermore, in some examples, agents other than the application vendor may replace, amend, or complement the translation information provided by the application vendor.

In some embodiments, translation information may contain mapping functions defining "mapping relationships" between data items. For example, a mapping function may define how a derived data item may be computed from fundamental data items as discussed above. In that case, the derived data item and the fundamental data item(s) may be said to be in a mapping relationship.

Figure 4:
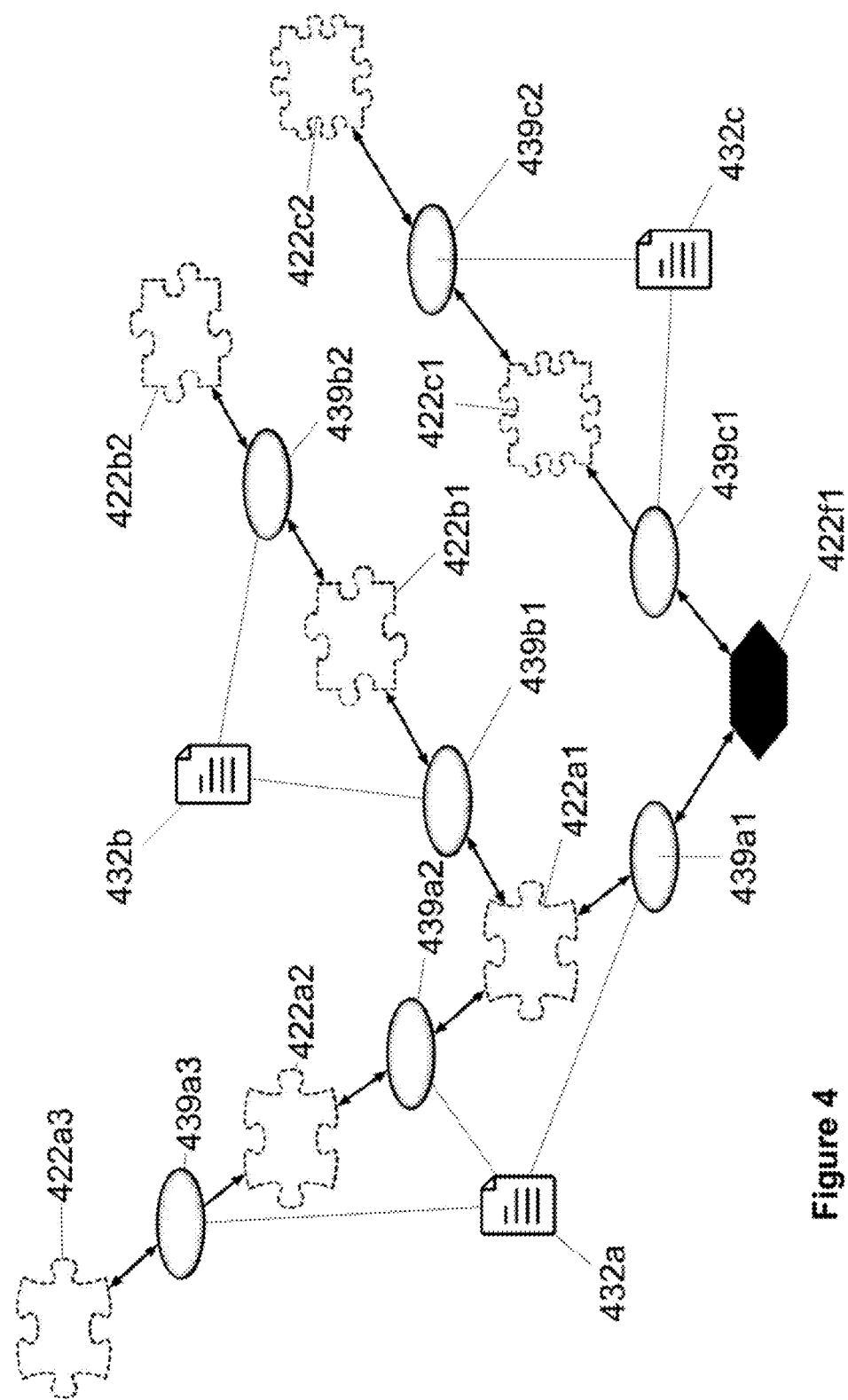
FIG. 4 shows an example of mapping relationships.

Mapping relationships may be transitive. For example, letting A, B and C refer to data items, if a A and B are in a mapping relationship, and B and C are in a mapping relationship, then A and C are in a mapping relationship. Referring now to FIG. 4, FIG. 4 showing an example of transitive mapping relationships. In this example the translation information 432*a* specifies mapping functions 439*a*1-*a*3, translation information 432*b* specifies mapping functions 439*b*1-*b*2 and translation information 432*c* specifies mapping functions 439*c*1-*c*2. The derived data items 422*a*1-*a*3, 422*b*1-*b*2 and 422*c*1-*c*2 are all computed, directly or indirectly, from the fundamental data item 422*f*1. Thus, all derived data items have a mapping relationship to the fundamental data item 422*f*1, and consequently to each other by the transitive property described above. Thus, for example, 422*a*3 and 422*b*2 have a mapping relationship.

Mapping functions may be expressed in a declarative or imperative language, or some other suitable format, in some embodiments. Furthermore, in various embodiments, mapping functions may be unidirectional or bidirectional. A unidirectional mapping function may define how the data store 120 computes certain derived data items from certain fundamental data items. However, the function for computing derived data items from fundamental data items may not provide any information as to how to translate creations, updates or deletions of derived data items into corresponding operations affecting fundamental data items. Such information may be provided in the form of bidirectional mapping functions.

A unidirectional mapping function may allow a derived data item to be computed from one or more fundamental data items, but may not allow derived data items to be created, updated or deleted. By contrast, bidirectional mapping functions may, in some embodiments, transform creations, updates, and deletions of derived data items into corresponding creations, updates, and deletions of fundamental data items, thereby indirectly causing the desired change in derived data items to take place. That is, bidirectional mapping functions may, in some embodiments, additionally express how to translate a given creation, update or deletion of a derived data item to operations affecting fundamental data items such that the derived data item maintains the expressed mapping relationship.

A shared data model may be provided alongside the execution environment 110 in some examples. Fundamental data items may be formatted according to the shared data model, which may act as a common mapping target for one or more applications. An application vendor may then provide translation information defining mapping relationships between derived data items formatted according to the application's data model, and fundamental data items formatted according to the shared data model. Thus, when a shared model is used, the author of an application's translation information may not need to be aware of the existence of any other applications.

Consequently, mapping functions may allow each application to operate on data items formatted according to its own application-specific data model, while the execution environment 110 translates the data access operations to data access operations that correspond to fundamental data items formatted according to a shared data model. In this way, the applications do not require knowledge about the shared data model. Furthermore, the applications may not have to be altered when the shared data model is updated or replaced.

Figure 1I:
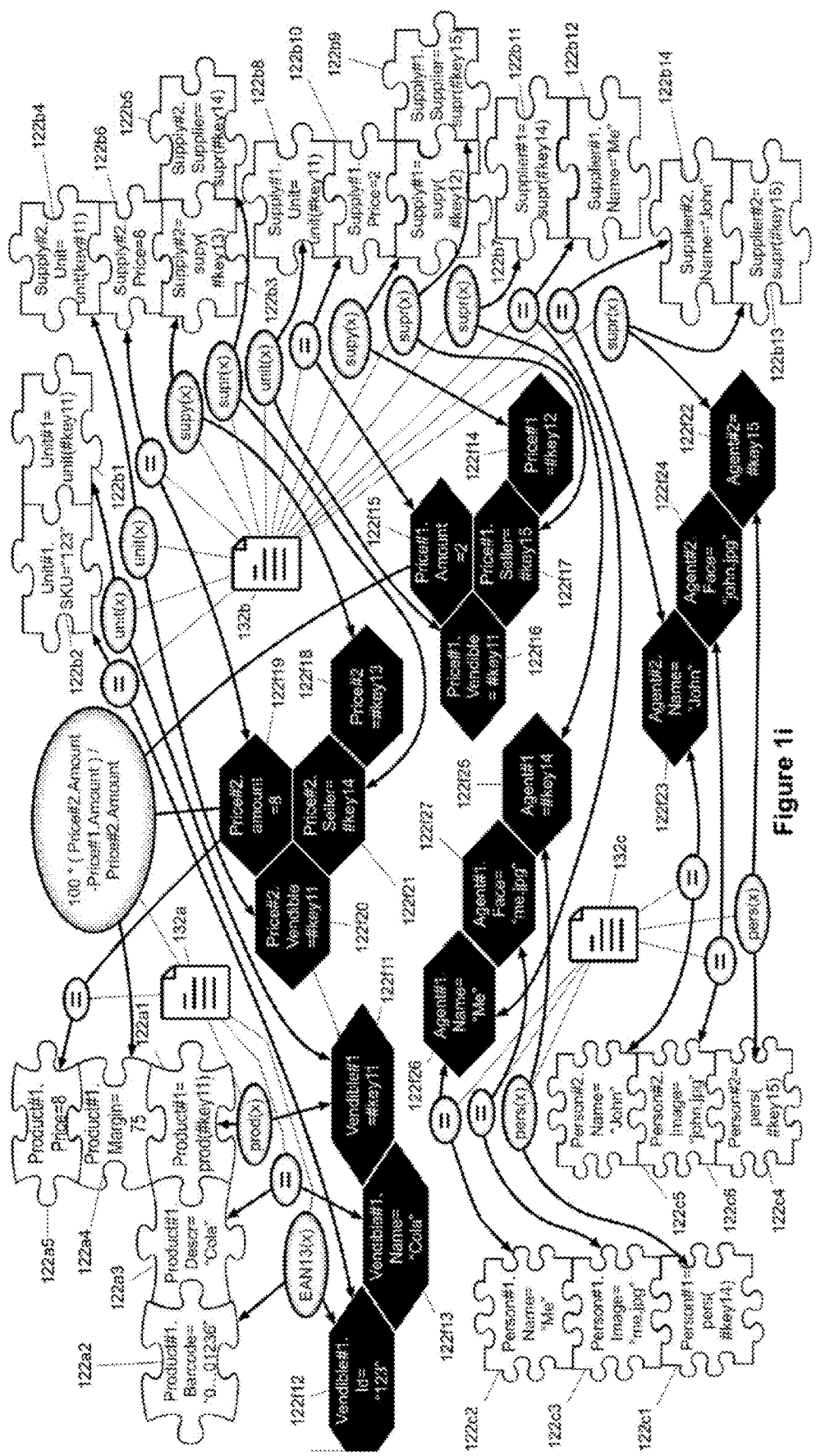
FIG. 1i shows an example mapping from application-specific data to shared data based on mapping functions.

Referring now to FIG. 1*i*, FIG. 1*i* shows the mapping functions defined in translation information 132*a-c* in the above example. The ellipses denote mapping functions, the arrows to which indicate if they are unidirectional or bidirectional, and indicate the direction for unidirectional functions. The mapping functions establish mapping relationships between derived data items, formatted according to the respective application-specific data models of applications 130*a-c*, and fundamental data items, which are formatted according to a shared data model in this example.

As can be seen in the figure, the derived "Product" data item 122*a*1, formatted according to the application-specific data model of the point-of-sale application 130*a*, is computed by a key transformation function "prod(x)" mapping function from the fundamental "Vendible" data item 122*f*11 in accordance with translation information 132*a*. In this example, key transformation mapping functions are used to compute keys for derived data items from the keys of fundamental data items, and vice versa. Similarly, the translation information 132*a* defines identity mapping functions (i.e., "f(x)=x") computing the derived "Product.Descr" data item 122*a*3 from the fundamental "Vendible.Name" data item 122*f*13. The derived "Product.Barcode" data item 122*a*2 is computed using an "EAN13" mapping function from the fundamental "Vendible.Id" data item 122*f*12. Also, the "Product.Price" derived data item 122*a*5 is computed by an identity mapping function from the fundamental "Price.Amount" data item 122*f*19. However, derived "Product.Margin" data item 122*a*4 is computed using a more complex mapping function "100*(Price #2.Amount−Price #1.Amount)/Price #2.Amount", which calculates the sales margin from the fundamental "Price.Amount" data items 122*f*19 and 122*f*15.

In this example, the derived "Unit" data item 122*b*1, formatted according to the application-specific data model of the procurement application 130*b*, is computed by a key translation mapping function "unit(x)" from the fundamental "Vendible" data item 122*f*11 in accordance with the translation information 132*b*. The corresponding derived "Unit.SKU" data item 122*b*2 is computed by an identity mapping function from the fundamental "Vendible.Id" data item 122*f*12.

The two derived "Supply" data items 122*b*3 and 122*b*7, also formatted in this example according to the application-specific data model of the procurement application 130*b*, are computed by key translation mapping functions "supy(x)" from the fundamental "Price" data items 122*f*18 and 122*f*14, respectively. The associated derived "Supply.Unit" data items 122*b*4 and 122*b*8 are computed by key translation mapping functions "unit(x)" from fundamental "Price.Vendible" data items 122*f*20 and 122*f*16, respectively. Further, the derived "Supply.Price" data items 122*b*6 and 122*b*10 are computed by identity mapping functions from fundamental "Price.Amount" data items 122*f*19 and 122*f*15, respectively. Lastly, the derived "Supply.Supplier" 122*b*5 and 122*b*9 are computed by key translation translation mapping functions "supr(x)", as described above, from fundamental "Price.Seller" data items 122*f*21 and 122*f*17, respectively.

The two derived "Supplier" data items 122*b*11 and 122*b*13, in this example also formatted according to the application-specific data model of the procurement app 130*b*, are computed by key translation mapping functions "supr(x)" from fundamental "Agent" data items 122*f*25 and 122*f*22, respectively. The associated derived "Supplier.Name" data items 122*b*12 and 122*b*14 are similarly computed by identity mapping functions from fundamental "Agent.Name" data items 122*f*26 and 122*f*23, respectively.

The derived "Person" data items 122*c*1 and 122*c*4, which in this example are formatted according to the application-specific data model of the contact management application 130*c*, are computed by key translation mapping functions "pers(x)" from the fundamental "Agent" data items 122*f*25 and 122*f*22, respectively. Their associated derived "Person.Name" data items 122*c*2 and 122*c*5, as well as the derived "Person.Image" data items 122*c*3 and 122*c*6, are similarly computed by identity mapping functions from fundamental "Agent.Name" and "Agent.Face" data items 122*f*26, 122*f*23, 122*f*27 and 122*f*24, respectively.

It should be appreciated that mapping functions may express any suitable transformation, in various embodiments. A detailed example of defining the mapping functions described above is provided as part of the "Examples of Methods" section below.

In some embodiments, the execution environment 110 may allow independently developed applications to present a combined user interface, as described above. This may be accomplished by generating "complementary" requests for further user interfaces in other applications. For example, many applications may have functionality related to a certain business entity such as a supplier. Instead of having to work in the applications separately, the user can navigate to the entity in one application that is not aware of the other applications. In this example the user interface request orchestrator 111 finds other applications that have functionality related to the same supplier and asks for user interfaces related to the supplier by generating complementary user interface requests. This request can be in the form of network requests or, in some embodiments, in-process function calls or interprocess calls. It should be appreciated that any suitable request format and delivery mechanism may be used in various embodiments according to this disclosure. In some embodiments, the execution environment 110 may collect responses to complementary requests and present their constituent user interfaces in a combined user interface.

Some embodiments may employ mapping relationships in generating complementary user interface requests targeting other applications. In the above example, an initial user interface request associated with "Product" data item 122a1 in the point-of-sale application 130a may result in the generation of a complementary user interface request associated with the "Unit" data item 122b1 of the procurement application 130b. This generation may be performed on the basis of the mapping relationship between derived "Product" and "Unit" data items 122a1 and 122b1. In this example, said mapping relationship exists due to the mapping relationships between the derived "Product" data item 122a1 and the fundamental "Vendible" data item 122f11, and between the derived "Unit" data item 122b1 and the same fundamental "Vendible" data item 122f11, respectively.

In some embodiments, an application's request handling logic may generate a response comprising a user interface comprising at least one representation of the values of the data items, hereinafter referred to as a user interface representing data items. For example, in a request for "/companies/acme" a user interface representing data items related to the "Acme" company may be provided in response. In the event that the user interface represents other data items than the one associated with the request, complementary requests for user interfaces related to those data items may be generated, by the applications or the execution environment 110, in various embodiments.

For example, if an application handles the request for "/companies/acme" by generating a user interface representing the name and email address to the company together with an enumeration of subpage user interfaces representing all contact persons at the company "Acme", the application may, in some embodiments, notify the user interface request orchestrator 111 that it is making "application-induced" user interface requests associated with the data items corresponding to each contact person. In some embodiments, application-induced requests may be fed back into the orchestrator 111 such that the complementary request generation process can repeat recursively. In this way, user interface requests may cascade such that multiple applications may contribute user interfaces for displaying information about each contact person, even though the contact person was not the data item associated with the original input request. The recursive cascading and nesting of user interfaces may continue until no application issues more additional user interface requests.

Additionally, in some embodiments, to avoid circular recursion or nonsensical cascading, a "size" or other form of context may be provided with each request to ensure that the recursion eventually terminates. Sizes may diminish so that an initial request with an abstract size "Page" for "/companies/acme" is handled by an application in such a way that an application-induced request for "/contacts/john" is issued with the smaller size "Subpage". Application request handling logic responding to requests with a "Subpage" size may choose to to issue further application-induced requests in a smaller size. For example, the phone numbers for each contact may, in turn, be requested in the size "Row". The end result in these embodiments is that the cascading recursive effect finally reaches handlers that do not respond to the size associated with the request. For example, after "Row" there might not be any smaller sizes left, in some examples.

It should be appreciated that the above example of diminishing size uses an abstract form factor, any suitable measure, whether abstract or concrete, may be used in various embodiments. For example, in some embodiments, size may be multidimensional and include semantic and visual constraints.

The following pseudocode describes an example procedure according to which the user interface request orchestrator 111 may process an input user interface request to generate complementary requests.

```
ProcessBrowserRequest(request):
    allResponses = [ ]
    ProcessRequest(allResponses, request)
    return CombineUserInterfaces(allResponses)
ProcessRequest(allResponses, request):
    response = request.GetResponse( )
    inducedRequests = response.GetAppInducedRequests( )
    for ir in inducedRequests:
        ProcessRequest(allResponses, ir)
    for complReq in FindComplementaryRequests(request):
        ProcessRequest(allResponses, complReq)
    allResponses.Add(response)
FindComplementaryRequests(request):
    array = [ ]
    item1 = request.GetAssociatedDataItem( )
    for item2 in item1.FindMappingRelationshipsDataItems( ):
        cr = TranslationInformation.GetRequestsFor(item2,
                                        request.WantedSize( ))
        array.Add(cr)
    return array
```

In some embodiments, a user interface request may simply be an identifier for the data item with which the request is associated. In that case, the user interface request orchestrator 111 may generate complementary requests by replacing the original data item identifier with identifiers for data items with which the original data item has a mapping relationship. In other embodiments, requests may be formatted according to the HTTP protocol and use paths to associate the request with a particular data item. For example, the path "/companies/acme" may associate a request with a "Company" data item named "Acme" in a customer relationship management (CRM) application. However, any suitable request format may be used, in different embodiments.

Figure 1J:
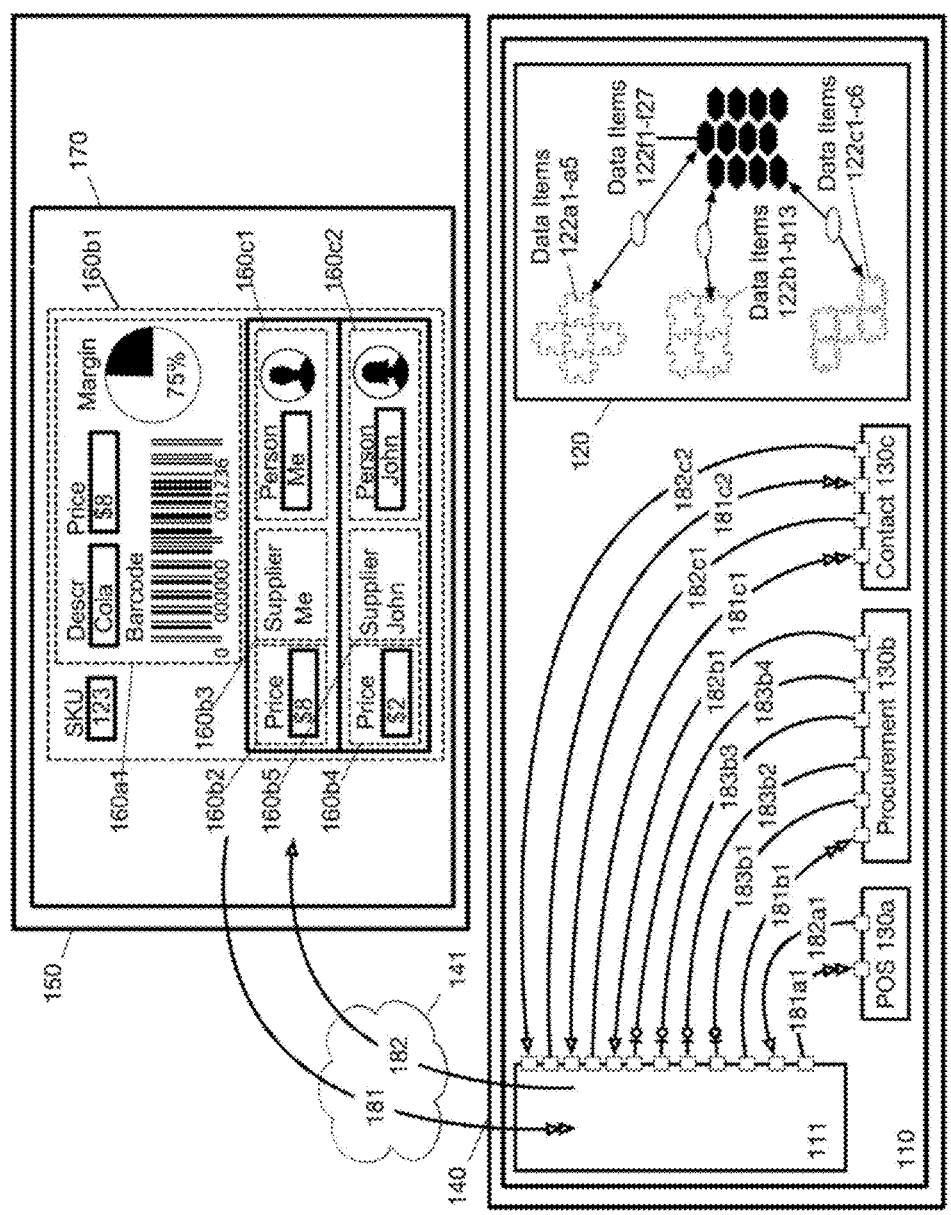
FIG. 1j shows an example of user interface request orchestration for enabling interoperation of independent software applications.
Figure 1K:
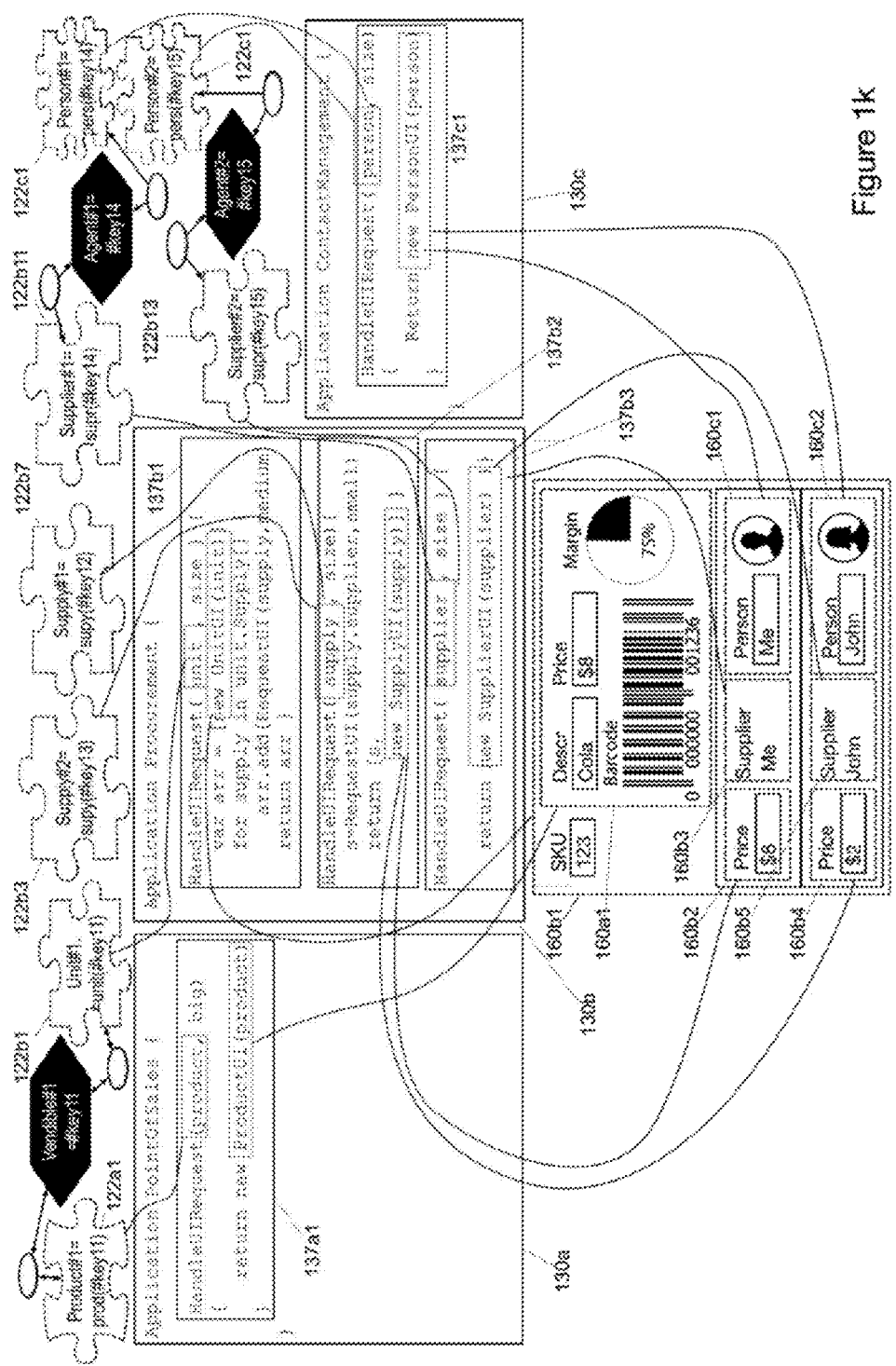
FIG. 1k shows an example of application user interface request handling pseudocode.

Referring now to FIGS. 1j and 1k, FIG. 1j shows an example of user interface request orchestration in the context of the grocery store example introduced above and FIG. 1k shows an example of application user interface request handling pseudo-code relating to the same example. The user is running a web browser 170 on her client computing device 150. The client computing device 150 is accessing a server computer system 140 executing an execution environment 110. In this example the execution environment 110 contains a data store 120 and user interface request orchestrator 111.

The user logs in to the point-of-sale application 130a with her web browser 170 and navigates to a page for editing the derived "Product" data item 122a1. The result of the navigation is an input user interface request 181, targeting application 130a, associated with derived "Product" data item 122a1. In this example, the user interface request orchestrator 111 receives the input request 181 and identifies it as being associated with derived "Product" data item 122a1. It should be appreciated that in other embodiments, the application or some other entity may receive the request and merely notify the request orchestrator 111 about the request. In this example, the user interface request orchestrator 111 attempts to compute the set of possible complementary user interface requests for user interfaces associated with data items to which the original data item has a mapping relationship, as described above. It finds one possible complementary request using the fact that the derived "Product" data item 122a1 is in a mapping relationship with the derived "Unit" data item 122b1, which belongs to application 130b. The user interface request orchestrator 111 then generates the complementary user interface request 181b1, associated with the derived "Unit" data item 122b1, and provides the generated request to the procurement application 130b. Further, in this example, the initial request 181 is forwarded as request 181a1 and provided to the point-of-sale application 130a.

When the point-of-sale application 130a receives user interface request 181a1, its request handler 137a1 provides a response 182a1 containing a user interface 160a1 comprising a "Barcode" widget comprising a visual representation of the value of the "Product.Barcode" data item 122a2 related to the "Product" data item 122a1 associated with request 181a1.

Upon receiving request 181b1 associated with the derived "Unit" data item 122b1, the procurement application's 130b request handler 137b1 begins by querying the data store 120 for "Supply" data items referencing the "Unit" data item 122b1 through their respective "Supply.Unit" data items. The data store 120 provides two matching "Supply" data items 122b3 and 122b7 to application 130b in response to the query. The request handler 137b1 then issues two application-induced user interface requests 183b1-b2 associated with the "Supply" data items 122b3 and 122b7. In this example, applications provide information to the user interface request orchestrator 111 when issuing application-induced user interface requests as, again, there might be more possible complementary user interface requests targeting other applications. The request handler 137b2 for "Supply" user interface requests, which handles the application-induced requests 183b1-b2 internally within the application, issues two more application-induced requests 183b3-b4, each associated with one of the "Supplier" data items 122b11 and 122b13 referenced by the the respective "Supply.Supplier" data items related to "Supply" data items 122b3 and 122b7 associated with requests 183b1-b2. The procurement application provides information about the application-induced requests 183b3-b4 to the user interface request orchestrator in the same way it provided information about requests 183b1-b2.

Before terminating, procurement application's 130b request handler 137b1 provides a response 182b1 to the user interface request orchestrator 111. The response 182b1, which includes responses to the application-induced requests 183b1-b4, contains a user interface 160b1 containing a "SKU" text input element representing the value of the "Unit.SKU" data item 122b2 belonging to the "Unit" data item 122b1, as well as two "Price" input elements representing the values of the respective "Supply.Price" data items 122b6 and 122b10 belonging to the two "Supply" data items 122b3 and 122b7.

In this example, the user interface request orchestrator 111 generates complementary user interface requests for application-induced user interface requests like 183b1-b4 in the same way as for input user interface requests, such as the input request 181. In this example, application-induced user interface requests 183a-b do not result in any complementary user interface requests. However, application-induced user interface requests 183c-d are used by the user interface request orchestrator 111 to generate complementary requests 181c1 and 181c2, respectively, and provided to the contact management application 130c. User interface requests 181c1 and 181c2 are associated with the "Person" data items 122c1 and 122c4, respectively. The generation is done on the basis that the "Person" 122c1 and 122c4 data items are in mapping relationships with the respective "Supplier" data items 122b11 and 122b13 associated with requests 183c-d.

Upon receiving the complementary user interface requests 181c1 and 181c2 associated with the "Person" data items 122c1 and 122c4, the contact management application 130c provides responses 182c1 and 182c2. The responses comprise user interfaces 160c1-c2 containing "Image" elements featuring visual representations of the values of the "Person.Image" data items 122c3 and 122c6 of the "Person" data items 122c1 and 122c4 associated with the user interface requests 181c1-c2.

In this example, the user interface request orchestrator 111 then collects responses 182a1, 182b1, 182c1 and 182c2 from applications 130a-c into a combined response 182. The combined response 182 is outputted by the execution environment 110 and received by the user's browser 170, which renders user interfaces 160a1, 160b1 and 160c1-c2 as a result. However, in some embodiments, responses may be outputted individually rather than collected into a combined response.

It should be appreciated that while the interaction in the above example is initiated by a user interface request associated with an application-specific data item, various embodiments according to this disclosure may instead initiate such interactions by user interface requests associated with a fundamental data item, or associated with multiple data items, whether fundamental or derived.

Furthermore, in some embodiments, the initial request, such as request 181, may be received by an application, such as application 130a, rather than by the execution environment 110. In such cases the receiving application may provide information about the request to the execution environment 110, allowing the user interface request orchestrator 111 to generate complementary user interface requests as described above. If the initial request is received by an application, the execution environment 110 may not need to provide the initial request to said application.

Real-Time User Interface Interoperability

In some embodiments, a user may interact with a combined user interface, as described above, in real time. For example, referring again to FIG. 1j, the user may type the number "123" into the "SKU" text input element of user interface 160b1 originating from the procurement application 130b, and see the change immediately reflected in the "Barcode" widget of user interface 160a1 originating from the point-of-sale application 130a.

The execution environment 110 may, in some embodiments, push updates to user interfaces containing representations of data items that have changed, such that the user may observe the changes in real time or near real time. Such changes may involve changing aspects of the user interface in real time that were not directly edited by the user. For example, if the user enters a new SKU value in user interface 160b1, it may also cause a corresponding real-time update to a displayed barcode in user interface 160a1. Thus, real-time updates may not be limited to the specific field or item the user is directly editing, but may also also affect other portions of the user interface that are related to the updated information, even in cases when those related portions are provided by different applications.

For example, bidirectional communication protocols such as the WebSocket protocol may be used to push data to the web browser 170 running on the client computing device 150. In other embodiments, the execution environment 110 may instead be polled for changes. In this example, the user's web browser 170, running on client device 150, has established a WebSocket connection 141 to the execution environment 110, running on a web server computing device 140, allowing for real-time bidirectional communication. Using the WebSocket connection 141, the web browser 170 may transmit the user's input to the execution environment 110. Moreover, in case data items are changed after the execution environment 110 has transmitted user interfaces comprising representations of the changed data items' values to the web browser 170, the execution environment 110 may use the WebSocket connection 141 to transmit user interface updates to the web browser 170.

While the above example uses the WebSocket protocol to provide bidirectional communication between the user's web browser 170 and the execution environment 110, other embodiments according to this disclosure may use any suitable means of communication.

Figure 1L:
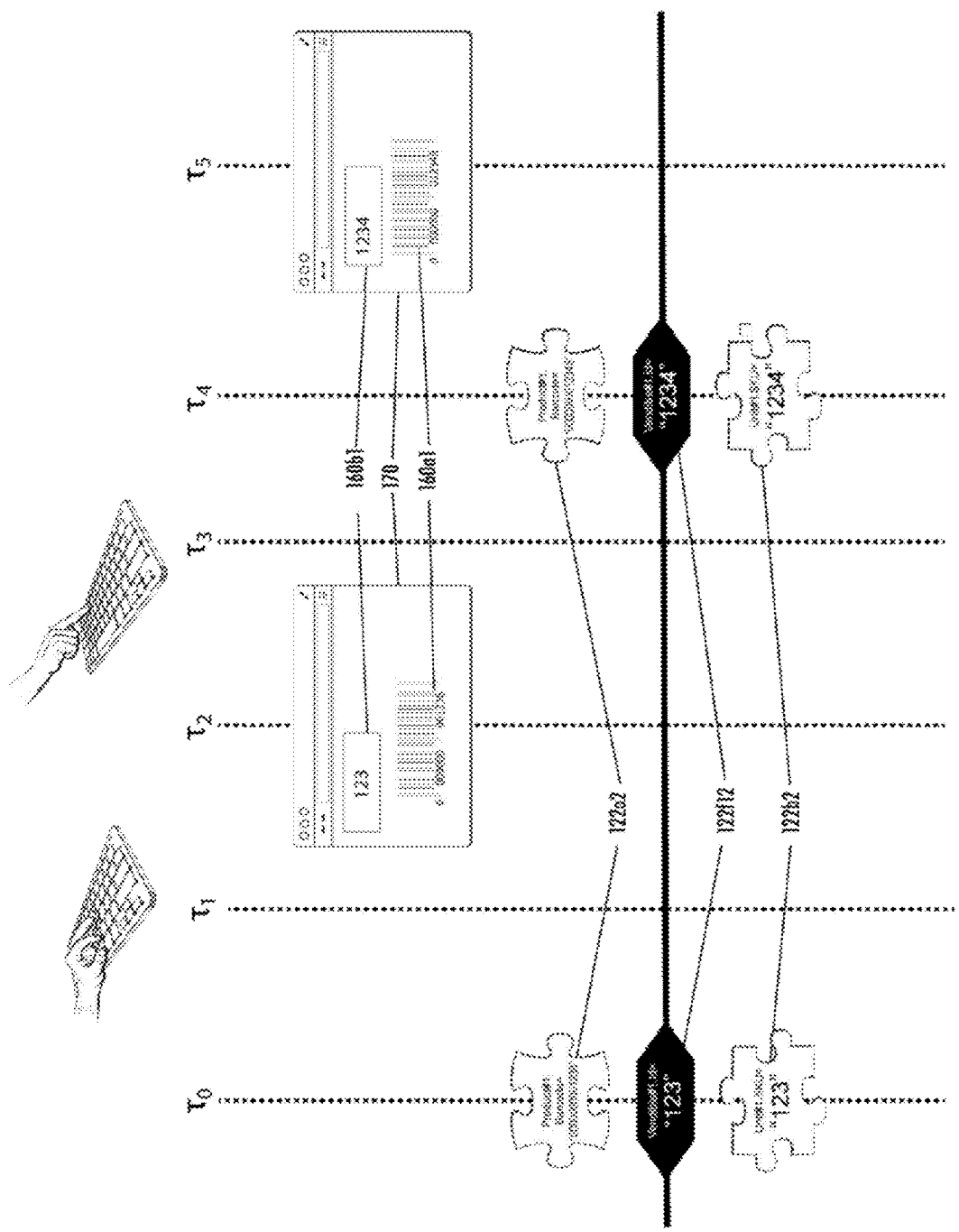
FIG. 1L shows an example of real-time user interface interaction for enabling interoperation of independent software applications.

Referring now to FIG. 1L, FIG. 1L shows an example of real-time user interface interaction. In this example, the execution environment 110 is executing the point-of-sale application 130a and the procurement application 130b. The point-of-sale application 130a has a derived "Product.Barcode" data item 122a2. Similarly, the procurement application 130b has a derived "Unit.SKU" data item 122b2. In this example, the derived data items 122a2 and 122b2 are computed from the same fundamental "Vendible.Id" data item 122f12. Consequently, derived data items 122a2 and 122b2 are each in mapping relationships with the fundamental data item 122f12, and with each other. However, while the "Unit.SKU" data item 122b2 is computed by an identity mapping function (i.e., "f(x)=x"), the "Product.Barcode" data item 122a2 is computed by an "EAN13" mapping function that left-pads the value with zeroes to 12 digits and appends a control digit.

Thus, at $\tau_0$, the "Unit.SKU" 122b2 has the same value "123" as the fundamental "Vendible.Id" data item 122f12, while the derived "Product.Barcode" data item 122a2 has the value "0000000001236" computed according to the EAN13 mapping function.

At $\tau_1$, the user navigates with her web browser to the to a "Product" editing page with her web browser 170. The web browser 170 sends an initial user interface request to the execution environment 110. In doing so, the web browser 170 also establishes a WebSocket connection 141 to the execution environment 110. The initial user interface request goes through the request translation procedure, as described above.

At $\tau_2$, the execution environment 110 outputs a combined user interface to the web browser 170, consisting of user interface 160a1 from the point-of-sale application 130a, and user interface 160b1 from the procurement application 130b. User interface 160a1 contains a "Barcode" widget, and user interface 160b1 contains "SKU" text input element. The "Barcode" and "SKU" elements contain representations of the values of the "Product.Barcode" data item 122a2 and the "Unit.SKU" data item 122b2, respectively.

At $\tau_3$, the user types a new value "1234" into the "SKU" text input element of user interface 160b1. The input is transmitted to the execution environment 110 through the WebSocket connection 141. The "SKU" element of user interface 160b1 is associated with the "Unit.SKU" data item 122b2, so the execution environment 110 assigns a new value to data item 122b2 in the data store 120. Since the "Unit.SKU" data item 122b2 is derived, its value may not be updated directly. Instead, the data store 120 consults the translation information 132b provided for application 130b, from which it determines that the new value should be assigned to the fundamental "Vendible.Id" data item 122f12, from which the "Unit.SKU" data item 122b2 is computed.

At $\tau_4$, the assignment of the value "1234" to the fundamental "Vendible.Id" data item 122f12 is executed. Since the "Product.Barcode" and "Unit.SKU" data items 122a2 and 122b2 are computed from the updated "Vendible.Id" data item 122f12, their values change accordingly. Thus, because the "Unit.SKU" data item 122b2 is computed by an identity mapping function, it gets the new value "1234". However, the "Product.Barcode" data item 122a2 gets the value "0000000012348", since it is computed by the EAN13 encoder mapping function.

At $\tau_5$, the execution environment 110 determines that user interfaces 160a1 and 160b1 should be updated, since they contain representations of values of data items that have been changed. Accordingly, the execution environment 110 computes new representations for the values of data items 122a2 and 122b2 and outputs them as updates to user interfaces 160a1 and 160b1, respectively, using the WebSocket connection 141.

Examples of Isolated Interaction Scopes

In one embodiment, multiple users may observe each other's changes while concurrently accessing the same data item. For example, the users may be collaboratively editing a text document, with each user seeing the changes made by the other users in real time. In such cases applications may access the data store 120 in a non-isolated way, i.e., within a global interaction scope. In another embodiment, each user may access the same data item within different isolated transactional contexts, i.e., within different interaction scopes. For example, two users may concurrently edit the same "customer" record without seeing the changes made by the other, until one of them saves his changes. Interaction scopes may not be limited to single users, sessions, etc., in some embodiments. For example, five users may participate in a first isolated interaction scope, seeing the changes made by the others in real time, while another three users may participate in a second isolated interaction scope that does not observe pending changes made in the first isolated interaction scope. Further embodiments employing different types and combinations of interaction scopes are contemplated by the scope of this disclosure.

Because data items may be accessed concurrently, for example by different users, sessions or applications, it may be desirable to provide controls to reduce or eliminate data inconsistencies that may result from concurrent access to the same data item. For example, to ensure the consistency of data items kept in the data store 120, the execution environment 110 may, in some examples, execute modifications to the data store 120 using transactional access to data items. For example, by providing isolated interaction scopes as described above, changes not yet finalized in one interaction scope may not be visible in other interaction scopes.

Using an isolated interaction scope may prevent observers not participating in the interaction scope from observing pending changes made in the interaction scope before they are committed. For example, if a user is typing a numeric value into a form in one interaction scope, observers not participating in that interaction scope may not be able to observe the change until it is committed. If the user is slowly typing "1234", other participants (e.g., applications, threads, code segments, etc.) in the interaction scope may immediately obtain the updated value, in real time as it is updated. However, observers outside the interaction scope may not be able to observe the value even if the typed values are entered into the same data item that is being observed keystroke for keystroke.

It should be appreciated that the execution environment 110 may provide interaction scopes with various isolation levels. In some embodiments, one or more of isolation levels such as "read uncommitted", "read committed", "repeatable reads", "snapshot", "serializable", etc., may be provided.

In some cases, pending changes in two concurrent interaction scopes may be in conflict with each other. For example, a first user in a first interaction scope may have updated a data item, while a second user in a second interaction scope deleted the same data item. Some embodiments according to this disclosure may employ schemes for conflict detection and resolution. For example, in one embodiment, conflicts such as the above may be reported to the user in the interaction scope that committed last, allowing the user to interactively resolve the conflicts. However, in other embodiments, conflicts may not be detected at all; instead, the changes in the interaction scope that committed last may overwrite some or all of the changes made in the interaction scope that committed first, or vice versa. Further schemes for conflict detection and resolution are contemplated by the scope of this disclosure.

Referring now to FIG. 2, FIG. 2 shows an example wherein a data item 222 is being accessed in three interaction scopes 223$a$-$c$ for the duration of the time steps $\tau_0$ through $\tau_{10}$. In this example, the interaction scopes 223$a$-$c$ are provided by an execution environment, such as execution environment 110 described above, and have property of being isolated.

At $\tau_0$ the "SKU" data item 222 has an initial value of "123". At $\tau_1$, a new interaction scope 223$a$ is initiated. At $\tau_2$, another new interaction scope 223$b$ is initiated using the isolation level "snapshot" or "serializable". Thus, at $\tau_2$ there are two concurrent interaction scopes.

In some embodiments, an interaction scope may be explicitly initiated by an application, such as by calling a Transaction.Scope( ), issuing a BEGIN TRANSACTION command or by a Form.Create( ) call. However, in other embodiments, interaction scopes may be established implicitly by observing the user interface hierarchy of the application by, for example, finding forms, documents or other visual or abstract boundaries to which an editing context can be established.

At $\tau_3$, an "SKU" value of "1234" is assigned to data item 222 in the context of interaction scope 223$a$. An observer observing the "SKU" value of data item 222 in the context of interaction scope 223$a$ will, at $\tau_4$, obtain the value "1234". However, also at $\tau_4$, an observer observing the "SKU" value of data item 222 in the context of interaction scope 223$b$ will observe the initial "SKU" value of "123".

At $\tau_5$, interaction scope 223$a$ is committed while interaction scope 223$b$ is open. Then, at $\tau_6$, another interaction scope 223$c$ is initiated.

At $\tau_7$, an observer observing data item 222 in the context of interaction scope 223$b$ still obtains the initial "SKU" value of "123". However, because the "SKU" value was assigned in interaction scope 223$a$, which was committed before interaction scope 223$c$ was initiated, the assignment made in of interaction scope 223$a$ is visible in interaction scope 223$c$. Thus, in interaction scope 223$c$, the observer at $\tau_7$ obtains the new SKU value of "1234".

If the interaction scope 223$b$ was instead created using the "read committed" isolation level, the observer at $\tau_7$ observing data item 222 in the context of interaction scope 223$b$ may instead obtain the committed value of "1234" from interaction scope 223$a$.

Interaction scopes 223$b$ and 223$c$ are committed at $\tau_8$ and $\tau_9$ respectively. Observations in interaction scopes initiated after a commit may obtain the committed changes. In some embodiments, such as in this example, a global read-only interaction scope, reflecting at all times the most recent committed changes, may be present. This is illustrated at $\tau_0$ and at $\tau_{10}$ in the figure. An observer observing the SKU value of data item 222 at $\tau_{10}$ will obtain the value "1234".

It should be appreciated that while two concurrent interaction scopes are shown in FIG. 2, various embodiments according to this disclosure may support any number of concurrent interaction scopes.

In this example, an interaction scope remains open over an extended period of time, e.g., fractions of a second, minutes, hours, days, etc., while a user is interacting with a user interface. For example, if a user is working in an application and entering information into a form, the interaction scope may remain open for the duration of time from when the user opens the form, enters information into the form, and then clicks a "Save" button, to save their form entries to the database, which may cause the execution environment 110 to attempt to close the interaction scope by committing the changes. If the commit fails due to the detection of conflicts as discussed above, the execution environment 110 may, in some embodiments, discard the pending changes made within the interaction scope, or it may, in other embodiments, present the user with some indication of the conflict, such as a form entry (or entries) that conflict with other modifications to the same data fields that occurred while the user was entering data into the form. Additionally, in some embodiments, the execution environment 110 may resolve the conflicts automatically by merging the pending changes. This may be accomplished using operational transforms or other heuristic methods. For example, if the user types in her address in the form, but another application in a different interaction scope downloads the address from a contacts database, the user may, in some embodiments, be presented with the form and both address values as well as a request to select which value should be saved.

In some embodiments, the execution environment 110 may permit a data item to be involved in only a single interaction scope at any time, which may prevent multiple concurrent, incompatible changes to data items; however such a scheme is not required. Schemes for mediating access to data items may be referred to as concurrency control schemes. The example execution environment 110 shown in FIG. 1$f$ employs an optimistic concurrency control scheme, but different examples according to this disclosure may employ different approaches to concurrency control, including various pessimistic and optimistic concurrency control schemes.

Unlike short running database transactions, commonly found in traditional database management systems, interaction scopes running in the context of a user interface, such as, for example, a form, need to take careful considerations when they commit. It is often not convenient to employ serializable isolation levels and pessimistic concurrency control (such as locking) as doing so may prevent other users from accessing the data while it is being displayed in a user interface. Similarly, using optimistic concurrency control, dealing with conflicts does not always allow for a transaction restart. However, it should be appreciated that such conventions are compatible with the techniques described herein, and may be employed in some embodiments.

In a traditional execution environment, applications may be provided transactional access to a data store. For example, a web application accessing an SQL database may receive an interaction scope that is different from another web application accessing the SQL database. However, in some embodiments, the execution environment 110 may provide multiple applications access to and allow them to participate in the same interaction scope.

It should be noted that applications such as 130a-c may be involved in more than one concurrent interaction scope. Further, in some embodiments, different runtime contexts, e.g., a session, a procedure activation, a thread, an object, a user interface, etc., within an application, may participate in different interaction scopes.

It should be appreciated that when the present application refers to "concurrent" or "simultaneous" actions, individual instructions from two different processes, threads, transactions, etc., may be executed sequentially by a processor, but that the respective duration of the multiple actions overlaps in time, at least in part. Thus, an interaction scope that is initiated at 12:00:00 and ended at 12:00:05 may be considered to be partially concurrent (or simultaneous) with another transaction that is initiated at 12:00:02 and ended at 12:00:07, even if individual processor instructions from the different actions are handled sequentially during the overlapping period.

Translation Information

Various embodiments according to this disclosure may allow separate translation information to be provided in a variety of ways. In one embodiment, translation information may be provided as a separate text file for each application, each loaded by the execution environment 110, as described above with respect to FIG. 1f. In another embodiment, translation information may be provided by means of an API call or a command, such as an HTTP POST request, issued to the execution environment 110. It should be noted that further ways of providing translation information are contemplated by the scope of this disclosure.

In some examples, translation information may be distributed with an application, but is replaceable without recompiling the application or modifying the application source code. For example, the translation information may be provided in a text file separate from the application's executable files, libraries, or other resources.

As noted above, translation information may include definitions of mapping functions. In some embodiments, mapping functions may be expressed at the level of data types. Thus, mapping functions may be described as using data types as to avoid having to provide mapping functions for each instance data item. In some embodiments, mapping functions can be declared based on on query languages such as for example SQL, Datalog, LINQ, GraphQL, SPARQL, etc. However, as some query languages only provide unidirectional functions, some embodiments may provide additional syntax. In someone embodiments, bidirectional mapping functions may be provided in part in the form of a view function and a CUD ("create, update, and delete") function. The view function may define how the data store 120 computes derived data items from fundamental data items. Furthermore, the CUD function may define how the data store 120 transforms write accesses to derived data items, such as operations that create, update or delete derived data items, into corresponding write accesses to fundamental data items that cause the desired changes in the derived data items. In an embodiment, an SQL-based query language is amended with a CREATE MAP statement as will be exemplified below. Analogous to how a CREATE VIEW statement may establish a functional relationship between an SQL view and an SQL table, a CREATE MAP statement may establish mapping relationships between data items of an application-specific data type and data items of a fundamental data type. By using the semantics of an SQL SELECT statement, unidirectional mapping functions can be described. In one example, the CREATE MAP statement is semantically similar to a CREATE VIEW statement in SQL and defines a mapping function. Unlike regular views, which are generally not updatable, or updatable only in limited cases, the CREATE MAP statement further allows the definition of bidirectional mapping functions that allow derived data items to be updated as discussed above.

The following example shows how a CREATE MAP statement may be used to define a bidirectional mapping function. In this example, the bidirectional mapping function is defined between derived "Person" data items of the contact application 130c, and fundamental "Agent" data items.

```
CREATE MAP FOR Person
DERIVED FROM Agent AS
SELECT a.Name AS Name, a.Face AS Image FROM Agent a
ON INSERT DO $$
    LET v = INSERT INTO Agent (
        Name, Face
    ) VALUES (APP.Name, APP.Image);
    RETURN v;
$$
ON UPDATE OF Name DO $$
    UPDATE Agent a SET a.Name = APP.Name
    WHERE a = ROOT;
$$
ON UPDATE OF Image DO $$
    UPDATE Agent a SET a.Face = APP.Image
    WHERE a = ROOT;
$$
ON DELETE DO $$
    DELETE FROM Agent a WHERE a = ROOT;
$$
```

Furthermore, mapping functions may be simple. For example, to compute an application-specific "Product" data item from a fundamental "Vendible" data item where a single "Product" has a one-to-one mapping to a single "Vendible", the mapping function may simply be the identity function ("f(x)=x"). However, it should be appreciated that an application-specific derived data items may not have a one-to-one correspondence to any fundamental data item. For example, mapping functions may dictate that a derived data item should exist if and only if two fundamental data items are in a particular relationship to each other. It should be appreciated that any suitable mapping function may be employed to compute a data item from one or more other data items, whether fundamental or derived, in various embodiments.

Examples of Maintaining Materialized Derived Data Items

As discussed in the "Data Items and the Data Store" section above, some embodiments according to this disclosure may compute derived data items on the fly, as they are accessed. For example, if a CREATE MAP statement has been provided that defines a mapping function computing application-specific derived "Product" data items from fundamental "Vendible" data items, the data store 120 may compute such derived "Product" data items by executing the query defined as part of the CREATE MAP statement. Thus, the "Product" data items are redundant, as they can always be computed from fundamental data items stored in the data store 120. This behavior is similar to how many relational database management systems implement the CREATE VIEW statement.

However, in some cases, it may be beneficial for the data store 120 to materialize redundant data items, even if they could be computed from other data items. For example, materializing the "Product" data items from the example above redundantly may allow the data store 120 to avoid executing a potentially inefficient query whenever "Product" data items are accessed. Thus, in some embodiments, some data items that may be computed from other data items may nevertheless be materialized in the memory of the data store 120. This is similar to how many relational database management systems implement the CREATE MATERIALIZED VIEW statement.

It should be noted that some examples employing the materialized scheme, as described above, may provide a maintenance facility to ensure that redundantly materialized data items are kept up to date as the data items from which they are computed are updated. For example, referring to the "Product" example above, the data store 120 may need to update "Product" data items stored in the data store 120 as "Vendible" data items are created, updated or deleted. Such a maintenance facility may, in some embodiments, cascade updates to derived data items after updates are made to fundamental data items from which they are computed. For example, the maintenance facility may maintain an index indicating derived materialized data items that derive directly or indirectly from a fundamental data item, and based on a detected change to the fundamental data item, employ the index to update the identified derived materialized data items. However, other methods of maintaining materialized derived data items are contemplated by the scope of this disclosure.

Computer Systems

Figure 3:
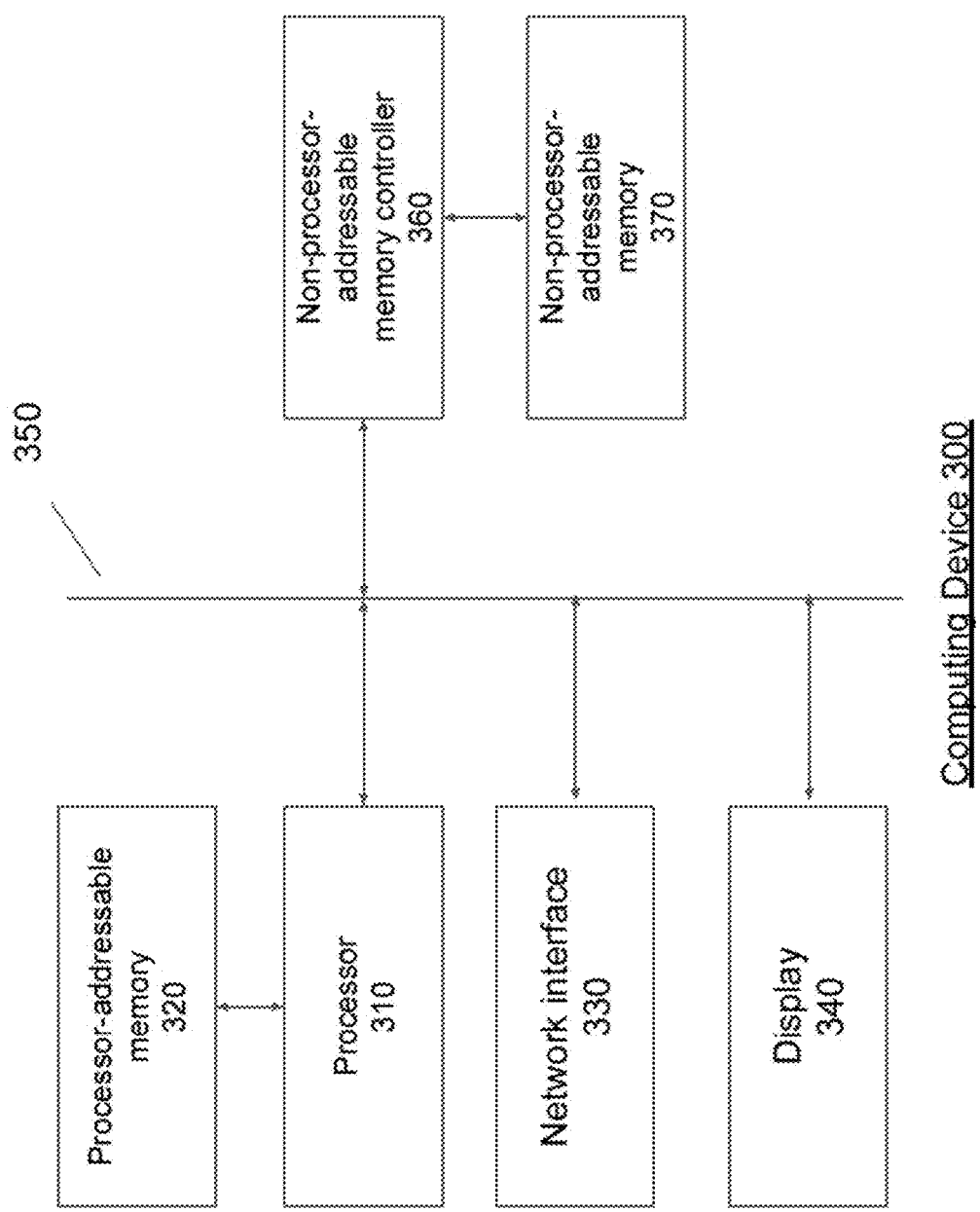
FIG. 3 shows an example computing device suitable in different examples for enabling interoperation of independent software applications.

Execution environments according to this disclosure, such as execution environment 110 described above with respect to FIG. 1*f*, may be executed by any suitable computer system. A computer system may be composed of one or more computing devices, such as the computing device 300 shown in FIG. 3. The computing device 300 includes a processor 310 in communication with a processor-addressable memory 320, which may be volatile memory such as SRAM or DRAM, or non-volatile memory such as NV(B)M, etc. Communication between the processor 310 and the processor-addressable memory 320 occurs over a memory bus. The example computing device 300 also includes a network interface 330 and a display 340. Communications bus 350 provides communication between the processor 310, the network interface 330, the display 340 and non-processor-addressable memory controller 360. The non-processor-addressable memory controller 360 is connected to a non-processor-addressable memory 370, which may be a storage device such as a hard drive, solid state disk, etc.

In some embodiments, a computer system may be composed of computing devices, such as computing device 300, interconnected over a network, such as a local area network or the Internet. In some embodiments, execution environment 110 may concurrently execute on one or more of the computing devices comprising the computer system. Alternatively, in other embodiments, various components of the execution environment 110 may execute on different computing devices. Furthermore, the memory of the data store 120 may be maintained across several computing devices, by techniques such as distributed shared memory or message passing, in various embodiments.

Processor-addressable memory may be any suitable memory that is addressable by the processor using a machine instruction, such as a "load" operation. Thus, in some computing devices, processor-addressable memory may be random-accessible memory ("RAM") configured in a persistent or volatile setting. In one example a persistent setting might use a disk based log file. In another example a persistent setting might use non-volatile memory (NVM). In yet another example, a persistent setting might use mapped memory where the processor-addressable memory maps to a persistent storage device by means of the operating system and the CPU. In contrast to processor addressable memory, non-processor-addressable memory is memory that is not addressable by the processor using a machine instruction as discussed above.

In this example, the computing device includes a network interface 330 and a display 340; however, such components are not required in some examples. For example, a suitable computing device may be operated in a server farm, where displays are not used. In some examples, a computing device may not have a network interface and instead may operate as a stand-alone computing system. Such examples still fall within the bounds of a computing device for purposes of this disclosure.

In some embodiments, execution environments according to this disclosure may be accessed from one or more remote computing devices. For example, referring again to FIG. 1*j*, FIG. 1*j* shows a remote client device 150 accessing the execution environment 110 through a web browser 170. However, it should be noted that other methods of remotely accessing the execution environment 110 are contemplated by the scope of this disclosure.

While some examples of methods and systems herein are described in terms of software executing on various machines, the methods and systems may also be implemented as specifically-configured hardware, such as a field-programmable gate array (FPGA) specifically configured to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM), coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

Accessing Data Items

It should be appreciated that the following examples are not intended to limit the scope of this disclosure, but only to give illustrative examples of declaring and instantiating data items.

Example execution environments according to this disclosure may allow applications to access data items. Such access may, in some embodiments, be provided by means of an API called by the application. In other embodiments, access may instead be provided by means of proxy objects as discussed below. This may be accomplished using the built in computer language syntax by exposing the data item using standard member accessors to objects, classes and attributes using techniques described in U.S. Pat. No. 8,266,125, entitled "Systems and Methods for Managing Databases," which is incorporated by reference herein in its entirety. In some embodiments, an application may employ data objects within its process-isolated memory space that are only weak references to data items. An example of such weak references may be proxy objects, as described below. Another example of such weak references may be computer language references. The values to which the weak reference refers may be represented by data items in the data store 120. Moreover, as described in detail above, access to data items may be provided in the context of a global or non-global interaction scope.

In some embodiments, applications may access data items by directly invoking APIs provided by the execution environment 110. In one example, an application written in the C programming language may use APIs such as the following:

```
data_item_t type = create_node_data_item("Product");
data_item_t barcode_field =
   create_node_data_item("Barcode");
data_item_t descr_field = create_node_data_item("Descr");
data_item_t price_field = create_node_data_item("Price");
data_item_t margin_field = create_node_data_item("Margin");
create_edge_data_item(type, "has", barcode_field);
create_edge_data_item(type, "has", descr_field);
create_edge_data_item(type, "has", price_field);
create_edge_data_item(type, "has", margin_field);
data_item_t inst = create_node_data_item("Product#1");
data_item_t barcode_field_value =
   create_node_data_item("0000000001236");
data_item_t descr_field_value =
   create_node_data_item("Cola");
data_item_t price_field_value = create_node_data_item(8);
data_item_t margin_field_value = create_node_data_item(75);
```

-continued

```
create_edge_data_item(inst, "is a", type);
create_edge_data_item(barcode_field_value, "is a",
   barcode_field);
create_edge_data_item(descr_field_value, "is a",
   descr_field);
create_edge_data_item(price_field_value, "is a",
   price_field);
create_edge_data_item(margin_field_value, "is a",
   margin_field);
create_edge_data_item(inst, "has", barcode_field_value);
create_edge_data_item(inst, "has", descr_field_value);
create_edge_data_item(inst, "has", price_field_value);
create_edge_data_item(inst, "has", margin_field_value);
```

The data items created in the example above could also be created using a simpler and more convenient API such as the following:

```
field_t fields[ ] = {
    { "Barcode", TYPE_STRING },
    { "Descr", TYPE_STRING },
    { "Price", TYPE_DECIMAL },
    { "Margin", TYPE_DECIMAL },
    { NULL, TYPE_END }
};
register_data_type("Product", fields);
data_item_t item = create_data_item("Product","Product#1");
set_data_item_field_string(item, 1 /* Barcode */,
   "0000000001236");
set_data_item_field_string(item, 2 /* Descr */, "Cola");
set_data_item_field_decimal(item, 3 /* Price */, 8);
set_data_item_field_decimal(item, 4 /* Margin */, 75);
```

In this example, multiple autonomous processor-isolated applications may access data items stored in data store memory. This may be accomplished using techniques described in U.S. Pat. No. 8,266,125, entitled "Systems and Methods for Managing Databases," which is incorporated by reference herein in its entirety.

Further, in this example, data items may be accessed using conventional computer language constructs such as C # class instances, JavaScript objects or C++ struct instances, SQL rows, etc. Normally, these different language constructs do not allow direct access to data items as defined herein. Thus, normally, a C # class instance is handled by means entirely different from how an SQL row is handled, and is further stored in incompatible formats, and in separate process-isolated memory spaces. However, according to methods disclosed herein, the execution environment 110 may enable such disparate constructs to directly access data items. Thus, various language constructs may provide an interface for the creation, modification, deletion and retrieval of data items irrespective of the computer language or constructs used.

In this example, when writing to a C # object, the same memory locations in data store memory may be accessed as when writing to a data item using a C program, or an SQL stored procedure by means of a SQL UPDATE statement. This may be accomplished using techniques described in U.S. Pat. No. 8,266,125, entitled "Systems and Methods for Managing Databases," which is incorporated by reference herein in its entirety.

In some embodiments, data items may be accessed using database commands, such as SQL commands. For example, an application may employ commands such as the following:

```
CREATE TABLE Product (
    Barcode  TEXT,
    Descr    TEXT,
    Price    DECIMAL,
    Margin   DECIMAL
);
INSERT INTO Product VALUES("0000000001236", "Cola", 8, 75);
UPDATE Product SET Barcode = "1234" WHERE Name = "Cola";
```

It should be noted that in some embodiments, code such as that of the SQL example above may be used to access data items created according to code such as the C example above. Thus, in some embodiments, data items may be created according to the constructs employed by one computer language, and later accessed using constructs employed by another computer language.

In one embodiment, the execution environment 110 may use declarations or configuration directives pertaining to classes, structs, objects, database tables, etc. to determine which computer language constructs should be handled as data items according to the above. It should be noted that other behaviors are possible in some embodiments. For example, the execution environment 110 may ensure that all appropriate computer language constructs are handled as data items such that, for example, all C++ class instances are handled as data items by the execution environment 110. Further, in some embodiments, the application may instead explicitly opt out of such handling, as appropriate.

For example, application 130a, which is written in the C# programming language, declares a Product class as can be seen below. In this case, the [Data Item] attribute indicates to the execution environment 110 that instances of Product shall be managed as data items.

```
[DataItem]
class Product {
    public string Barcode { get; set; }
    public string Descr { get; set; }
    public decimal Price { get; set; }
    public decimal Margin { get; set; }
}
```

In the example above, the execution environment 110 contains functionality for modifying the executable code of the application at load time, prior to executing the application. For example, in the case of C# application 130a, the execution environment 110 parses metadata of the application to find classes annotated with the [Data Item] attribute. It then inspects the Common Intermediate Language (CIL) bytecode of the application, looking for instructions that access (e.g., by instantiating, reading or writing property values, etc.) instances of the class. In this example, the execution environment 110 rewrites such instructions so that they access a corresponding data item instead, such as by invoking APIs provided by the execution environment 110.

For example, the execution environment 110 may rewrite the CIL bytecode of application 130a so that it corresponds to the following class definition:

```
class Product {
    private ulong _itemId;
    public Product( ) {
        _itemId = ExeEnv.CreateDataItem("Product");
    }
```
```
    public string GTIN {
        get {
            return ExeEnv.GetFieldDataItem(
                _itemId, "GTIN"
            ).GetValue<string>( );
        } set {
            ExeEnv.GetFieldDataItem(
                _itemId, "GTIN"
            ).SetValue(value);
        }
    }
    public string Name {
        get {
            return ExeEnv.GetFieldDataItem(
                _itemId, "Name"
            ).GetValue<string>( );
        } set {
            ExeEnv.GetFieldDataItem(
                _itemid, "Name"
            ).SetValue(value);
        }
    }
    public int OutPrice {
        get {
            return ExeEnv.GetFieldDataItem(
                _itemId, "OutPrice"
            ).GetValue<int>( );
        } set {
            ExeEnv.GetFieldDataItem(
                _itemId, "OutPrice"
            ).SetValue(value);
        }
    }
}
```

It should be noted that while the example class above invokes API functions provided by the execution environment 110 to access data items, some embodiments may allow the applications direct access to the memory of the data store 120, even when applications are process-isolated. For example, in one embodiment, applications are provided access to the data store 120 using shared memory or using techniques described in U.S. Pat. No. 8,266,125, entitled "Systems and Methods for Managing Databases," which is incorporated by reference herein in its entirety. In some such examples, applications may be able to access data items with the same efficiency as they would access data stored in their own private heap.

The scheme for handling conventional programming language constructs described above with respect to the example C# application 130a may be referred to as the "proxy object" scheme herein. In some embodiments, applications employing a proxy object to access a data item may still have a conventional object on their own heap acting as a proxy for accessing the data item. Such proxy objects may not directly store the value of the data item which they represent, in some embodiments. For example, in one embodiment, a proxy object may store only an identifier for the data item it represents, as seen in the example above, and perform all accesses (such as reading or writing fields, deleting the data item, etc.) by providing this identifier to the corresponding API functions exposed by the execution environment 110.

It should be appreciated that while the example above describes one scheme for handling conventional programming language constructs (in this case, C# objects) as data items, further schemes are contemplated by the scope of the invention. In some embodiments, a computer language implementation might natively provide the requisite functionality to access the underlying data item structures. For example, the execution environment 110 may provide an implementation of a computer language that has no other storage facility than the data store 120. Thus, in such cases, no proxy object may be employed.

In the above example, when the processor 310 is executing the code of application 130a, the application instantiates a new Product instance according to the following statement. As a result, the execution environment 110 creates a set of new data items representing the product and its properties. The application may then employ the Product instance p to access the data items.

---
Product p = new Product {
    GTIN="789",
    Name="Apple" };
---

It should be appreciated that in a conventional process running a C # program, such a statement would instantiate a new object whose property values would be stored in heap memory available only to the process itself. However, the example execution environment 110 shown in FIG. 1f creates data items in the data store. In this example, the application 130a can directly access the values of its property data items by using the following statement:

p.OutPrice=p.OutPrice+10;

Normally, the above statement would only affect the local heap, thus only be observable in a single application. However, in this example, the C # object would have its properties uniformly stored together with other data items, potentially not originating as C # objects.

Example execution environments according to this disclosure may allow applications to issue queries using a database query language. In response to such queries, the execution environment 110 may provide access to data items to the application. For example, after a data item has been created in the data store 120, it may later be retrieved by means of an SQL query. In this example, the following statement may retrieve a proxy object that may be used by an application such as application 130a to access the data item.

---
Product p = Sql.GetFirst<Product>(
    "SELECT p FROM Product p WHERE p.Descr=?", "Cola");
---

In some embodiments, the data store 120 may be ACID-compliant (atomicity, consistency, isolation, durability). Durability may be achieved by maintaining the data store memory in non-volatile memory or writing to a persistent transaction log, etc. Atomicity, consistency and isolation may be achieved by providing isolated interaction scopes, as will be discussed in detail below.

Examples of Methods

Figure 5:
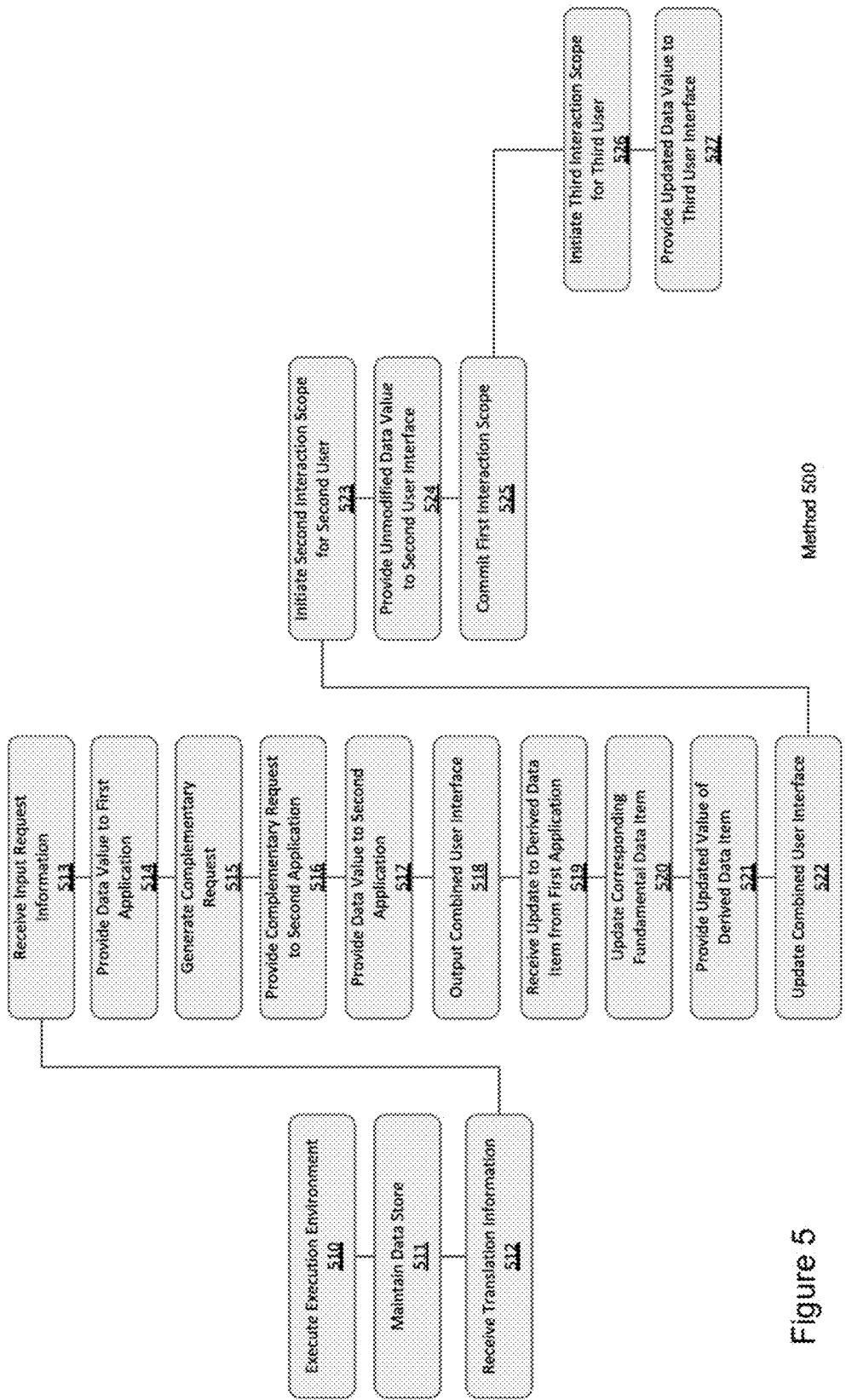
FIG. 5 shows an example method for enabling interoperation of independent software applications.

Referring now to FIG. 5, FIG. 5 shows an example method 500 for enabling interoperation of independent software applications. The example method 500 is described in the context of the example execution environment 110 discussed above with respect to FIGS. 1a-1j.

At block 510, a computer system executes, by one or more processors, an execution environment 110 as discussed with respect to FIG. 1f above. In this example, the execution environment 110 includes an operating system ("OS") that provides typical OS capabilities, such as memory management, multi-tasking, multi-threading, device drivers, disk management etc. The OS further maintains an in-memory data store 120 and related data management functions including transactional data access and a query execution engine 112. The OS further comprises a user interface request orchestrator 111.

At block 511, the computer system maintains a data store memory. In this example, the data store memory is maintained in processor-addressable, non-volatile RAM memory ("NV(B)M") of the computer system. Thus, in this example, the data store 120 is automatically durable, due to the non-volatile nature of the memory in which it is maintained. In other embodiments, the data store memory may instead be maintained in volatile processor-addressable memory, e.g., DRAM. In such cases, durability may achieved by, for example, maintaining a transaction log in non-processor-addressable memory of a persistent storage device.

Moreover, in some embodiments, the data store memory may not be maintained in processor-addressable memory. For example, in some embodiments, the data store memory may be maintained in non-processor-addressable memory of a persistent storage device. Still further ways of maintaining a data store memory are contemplated by the scope of this disclosure.

In this example, the execution environment 110 is provided with a shared data model. It is comprised of a data type "Vendible", representing goods that can be bought or sold, a data type "Price" representing prices or such goods, and a data type "Agent" representing people or organizations who can sell goods at a particular price. It should be noted that this example is written in an extended dialect of SQL in which data types may be used as column types. This may be accomplished using techniques described in U.S. Pat. No. 8,266,125, entitled "Systems and Methods for Managing Databases," which is incorporated by reference herein in its entirety.

---
```
CREATE TABLE Vendible (
    Id              TEXT,
    Name            TEXT,
    Quantity        DECIMAL
);
CREATE TABLE Price (
    Vendible        Vendible,
    Seller          Agent,
    Amount          DECIMAL
);
CREATE TABLE Agent (
    Name            TEXT,
    Face            TEXT
);
```
---

In this example, the data store 120 initially contains the following fundamental data items, formatted according to the shared data model presented above. The data items are presented using the notation "<parent>[.<child>]=<value>" where the child is a property of the parent. It is worth noting that the tables and columns of the shared data model are also represented as data items.

---
| | |
|---|---|
| Vendible | = #key1 |
| Vendible.Id | = #key2 |
| Vendible.Name | = #key3 |
| Vendible#1.Key | = #key11 |
| Vendible#1.Id | = "123" |
| Vendible#1.Name | = "Cola" |
| Agent | = #key8 |
| Agent.Name | = #key9 |
| Agent.Face | = #key10 |
| Agent#1 | = #key14 |

-continued

| | |
|---|---|
| Agent#1.Name | = "Me" |
| Agent#1.Face | = "me.jpg" |
| Agent#2 | = #key15 |
| Agent#2.Name | = "John" |
| Agent#2.Face | = "john.jpg" |
| Price | = #key4 |
| Price.Amount | = #key5 |
| Price.Vendible | = #key6 |
| Price.Seller | = #key7 |
| Price#1 | = #key12 |
| Price#1.Amount | = 2 |
| Price#1.Vendible | = #key11 |
| Price#1.Seller | = #key15 |
| Price#2 | = #key13 |
| Price#2.Amount | = 8 |
| Price#2.Vendible | = #key11 |
| Price#2.Seller | = #key14 |

The administrator of the execution environment 110 installs a point-of-sale application 130a and a procurement application 130b, each using different application-specific data models and user interfaces.

The point-of-sale application, 130a, which provides product information management functionality, has an application-specific data type "Product". Since application 130a is written in the C # programming language, the data type is declared as a class annotated with the [Data Item] attribute, as described in detail in the section entitled "Accessing Data Items".

```
[DataItem]
public class Product {
    public string Barcode { get; set; }
    public string Descr { get; set; }
    public Nullable<decimal> Price { get; set; }
    public decimal Margin { get; set; }
}
```

The second software application 130b, which represents a procurement application, is written in the Python programming language. Its application-specific data model includes the "Unit". "Supply" and "Supplier" data types defined as follows:

```
@dataitem
class Unit:
    def __init__(self, sku):
        self.sku = barcode
@dataitem
class Supply:
    def __init__(self, unit, supplier, price):
        self.unit = unit
        self.supplier = supplier
        self.price = price
@dataitem
class Supplier:
    def __init__(self, name, image):
        self.name = name
        self.image = image
```

While the application data models are defined using various programming language constructs in this example, it should be appreciated that any suitable facility for describing data models may be used, in various embodiments. Moreover, some embodiments may use multiple facilities for defining data models.

The execution environment 110 maintains process isolation between the applications in this example. However, applications may not be process-isolated. For example, several applications from different may be executed in a single "host process" in some embodiments.

In this example, when running the two applications 130a-b at this stage, the application operate as conventional siloed software applications: The applications' user interfaces are separated, and their data is separate, as each application defines their own unique tables and user interface.

The user now installs two text files, one for each of the applications 130a-b, containing translation information 132a-b that define bidirectional mapping functions between derived data items, formatted according to the applications' respective data models, and fundamental data items formatted according to the shared data model presented above.

It should be appreciated that while the translation information in this example is provided in the form of text files, any suitable form of translation information according to this disclosure may be employed according to different embodiments.

At block 512, the execution environment 110 receives translation information 132a for the point-of-sale application 130a and second translation information 132b for the procurement application 130b. Translation information 132a defines a mapping relationship between a first derived "Product" data item 122a1 and a fundamental "Vendible" data item 122f11. Similarly, translation information 132b defines a mapping relationship between a derived "Unit" data item 122b1 and the same fundamental "Vendible" data item 122f11. The derived data items 122a1 and 122a2 are formatted according to the data models of applications 130a and 130b, respectively.

In this example, bidirectional mapping functions are defined using familiar syntax based on the SQL language. The translation information 132a contains the following CREATE MAP statement defining a bidirectional mapping function that computes derived "Product" data items using fundamental "Vendible", "Price" and "Agent" data items. The mapping functions related to the "Product" data items described above in relation to FIG. 1i can thus be expressed as follows:

```
CREATE MAP FOR Product
DERIVED FROM v AS
SELECT EncodeEAN13(v.Id) AS Barcode,
       v.Name AS Descr,
       po.Amount AS Price,
       COALESCE(100*(po.Amount-pi.Amount)/po.Amount, 0)
           AS Margin
    FROM Vendible v
    LEFT OUTER JOIN Price pi
        ON pi.Vendible = v AND pi.Seller.Name <> "Me"
    LEFT OUTER JOIN Price po
        ON po.Vendible = v AND po.Seller.Name = "Me"
    ON INSERT DO $$
        LET v = INSERT INTO Vendible (
                Id, Name, Quantity
        ) VALUES (
                APP.Barcode, APP.Descr, 0
        );
        IF APP.Price IS NOT NULL OR
            APP.Margin IS NOT NULL THEN
                RAISE ERROR "Margin and Price cannot be
                    updated.";
        END IF;
        RETURN v;
    $$
    ON UPDATE OF Barcode DO $$
        UPDATE Vendible v
        SET v.Id = DecodeEAN13(APP.Barcode)
        WHERE v = ROOT;
```

```
$$
ON UPDATE OF Descr DO $$
        UPDATE Vendible v SET v.Name = APP.Descr
            WHERE v = ROOT;
$$
ON UPDATE OF Price DO $$
        RAISE ERROR "Price cannot be updated.";
$$
ON UPDATE OF Margin DO $$
        RAISE ERROR "Margin cannot be updated.";
$$
ON DELETE DO $$
        DELETE FROM Price p WHERE p.Vendible = ROOT;
        DELETE FROM Vendible v WHERE v = ROOT;
$$
```

The mapping function introduced by the above CREATE MAP is bidirectional. The creation of a derived "Product" data item is translated into the creation of a fundamental "Vendible" data item and two fundamental "Price" data items. Similarly, updating a derived "Product" data item results in updating a fundamental "Vendible" or "Price" data item, and deleting a derived "Product" data item results in deleting the corresponding fundamental "Vendible" and "Price" data items. Similarly, reading the value of the "Barcode", "Descr", "Price" or "Margin" data items of the derived "Product" data item is equivalent to reading the value of the corresponding fundamental data item according to the definition mapping function.

Thus, while application 130a believes that it is creating, updating, or deleting "Product" data items, the data store 120 does not execute such operations directly in this example. Instead, data store 120 executes the operations by interpreting the ON INSERT, ON UPDATE, or ON DELETE portions of the CREATE MAP statement, which may instruct it to create, update or delete fundamental data items, as described above, resulting in changes to affected derived "Product" data items, due to the functional nature of the mapping.

It should be noted that mapping functions as discussed above might not directly compute derived data items from fundamental data items. Instead, derived data items may be computed from further derived data items, so long as the computation eventually involves one or more fundamental data items. Similarly, CUD ("create, update and delete") functions, such as those defined by the ON INSERT, ON UPDATE, and ON DELETED directives in the CREATE MAP statements above, might not directly translate write accesses to derived data items into write accesses to fundamental data items. Instead, write accesses to derived data items may be translated into write accesses to further derived data items, so long as the translation eventually involves one or more fundamental data items.

While mapping functions are provided in the form of CREATE MAP statements in this example, any suitable format for providing mapping functions may be used, in various embodiments.

It should be noted that while this example syntax defines mapping functions computing application-specific derived data items based on fundamental data items, other examples may employ a similar syntax without distinguishing derived from fundamental data items. In one example, a variation of the CREATE MAP statement may be used to describe one application's derived data items as a function of another application's derived data items.

In some embodiments, the HTTP protocol may be used as the format of user interface requests. In such cases, a URL identifying an application user interface request handler might follow a syntax known by the execution environment 110 such that the derived data item associated with a request can be identified by the user interface request orchestrator 111 by parsing the request. Further, in some embodiments, all request handler URL's may use the format "/<app-name>/<data-item-id>". In that case, the user interface request orchestrator 111 may identify the derived data item by extracting the "<data-item-id>" field of the URL. In this example, however, the URL structure is application-specific such that information is needed in the translation information 132a as follows:

```
CREATE REQUEST FORMAT FOR
        "/point-of-sale/product/{{Product.Descr}}"
    IDENTIFYING Product
```

The above statement informs the execution environment that the URL "http://mysampleapp.com/point-of-sale/product/Cola" points to a "Product" data item whose related "Product.Descr" data item contains the value "Cola".

As with the first software application 130a, translation information 132b has been provided to the execution environment 110 for the procurement application 130b. The translation information includes the following CREATE MAP statement. The mapping functions related to the "Unit", "Supply" and "Supplier" data items described above in relation to FIG. 1i can thus be expressed as follows:

```
CREATE MAP FOR Unit
DERIVED FROM v AS
SELECT v.Id AS sku FROM Vendible v
ON INSERT DO $$
        LET v = INSERT INTO Vendible(Id) VALUES(APP.sku);
        RETURN v;
$$
ON UPDATE OF sku DO $$
        UPDATE Vendible v SET v.Id = APP.sku WHERE v = ROOT;
$$
ON DELETE DO $$
        DELETE FROM Vendible v WHERE v = ROOT;
$$
CREATE MAP FOR Supply
DERIVED FROM p AS
SELECT TRANSLATE(p.Vendible AS Unit) AS unit,
        TRANSLATE(p.Seller AS Supplier) AS supplier,
        p.Amount AS as price
ON INSERT DO $$
        LET v = INSERT INTO Price (
                Vendible, Seller, Amount
        ) VALUES (
                TRANSLATE(APP.unit AS Vendible),
                TRANSLATE(APP.supplier AS Agent),
                APP.price
        );
        RETURN v;
$$
ON UPDATE OF unit DO $$
        UPDATE Price p
        SET p.Vendible = TRANSLATE(APP.unit AS Vendible)
        WHERE p = ROOT;
$$
ON UPDATE OF seller DO $$
        UPDATE Price p
        SET p.Seller = TRANSLATE(APP.supplier AS Agent)
        WHERE p = ROOT;
$$
ON UPDATE OF price DO $$
        UPDATE Price p SET p.Amount = APP.price
        WHERE p = ROOT;
$$
CREATE MAP FOR Supplier
DERIVED FROM a AS
```

-continued

```
SELECT a.Name as name, a.Face as image FROM Agent a
ON INSERT DO $$
    LET v = INSERT INTO Agent (
        Name, Face
    ) VALUES(APP.name, APP.image);
    RETURN v;
$$
ON UPDATE OF name DO $$
    UPDATE Agent a SET a.Name = APP.name WHERE a = ROOT;
$$
ON UPDATE OF image DO $$
    UPDATE Agent a SET a.Face = APP.image WHERE a = ROOT;
$$
ON DELETE DO $$
    DELETE FROM Agent a WHERE a = ROOT;
$$
```

The translation information 132b for the procurement application 130b also contains the following request format definition, similar to that of the point-of-sale application 130a above:

```
CREATE REQUEST FORMAT FOR
    "/procurement/unit/{{Unit.SKU}}
    IDENTIFYING Unit
```

The third software application 130c, which represents a contact management application, is written in the JavaScript programming language. However, unlike the examples above, application 130c defines its application-specific data model using SQL. The data model includes an application-specific "Person" data type defined as follows:

```
CREATE TABLE Person (
    Name        TEXT,
    Image       TEXT
);
```

When executing the above CREATE TABLE statement in a conventional setting, a native database table may be created. In this example, however, the CREATE MAP statement below silently replaces the table with an updatable view.

As with applications 130a-b, the execution environment has been provided translation information for application 130c. The translation information contains the following CREATE MAP statement:

```
CREATE MAP FOR Person
DERIVED FROM Agent AS
    SELECT a.Name AS Name, a.Face AS Image FROM Agent a
ON INSERT DO $$
    LET v = INSERT INTO Agent (
        Name, Face
    ) VALUES (APP.Name, APP.Image);
    RETURN v;
$$
ON UPDATE OF Name DO $$
        UPDATE Agent a SET a.Name = APP.Name
            WHERE a = ROOT;
$$
ON UPDATE OF Image DO $$
        UPDATE Agent a SET a.Face = APP.Image
            WHERE a = ROOT;
$$
ON DELETE DO $$
        DELETE FROM Agent a WHERE a = ROOT;
$$
```

The translation information 132c for the contact management application 130c also contains the following request format definition, similar to that of the point-of-sale and procurement applications 130a-b above:

```
CREATE REQUEST FORMAT FOR
    "/contact/person/{{Person.Name}}
    IDENTIFYING Person
```

Referring again to FIG. 1i, FIG. 1i shows the resulting mapping functions defined by the CREATE MAP statements in the foregoing example.

After the execution environment 110 has received the above translation information, the data store 120 contains the following derived data items in addition to the fundamental data items described above:

| | |
|---|---|
| Product | = prod(#key1) |
| Product.Barcode | = prod(#key2) |
| Product.Descr | = prod(#key3) |
| Unit | = unit(#key1) |
| Unit.SKU | = unit(#key2) |
| Supply | = supy(#key4) |
| Supply.Price | = supy(#key5) |
| Supply.Unit | = supy(#key6) |
| Supply.Supplier | = supy(#key7) |
| Supplier | = supr(#key8) |
| Supplier.Name | = supr(#key9) |
| Person | = pers(#key8) |
| Person.Name | = pers(#key9) |
| Person.Image | = pers(#key10) |
| Product#1 | = prod(#key11) |
| Product#1.Barcode | = "0000000001236" |
| Product#1.Descr | = "Cola" |
| Product#1.Price | = 8 |
| Product#1.Margin | = 75 |
| Unit#1 | = unit(#key11) |
| Unit#1.SKU | = "123" |
| Supplier#1 | = supr(#key14) |
| Supplier#1.Name | = "Me" |
| Supplier#1.Image | = "me.jpg" |
| Supplier#2 | = supr(#key15) |
| Supplier#2.Name | = "John" |
| Supplier#2.Image | = "john.jpg" |
| Supply#1 | = supy(#key12) |
| Supply#1.Price | = 2 |
| Supply#1.Unit | = unit(#key11) |
| Supply#1.Supplier | = supr(#key15) |
| Supply#2 | = supy(#key13) |
| Supply#2.Price | = 8 |
| Supply#2.Unit | = unit(#key11) |
| Supply#2.Supplier | = supr(#key14) |

In this example, the data store 120 materializes all derived data items. That is, the derived data items' values are physically stored in the memory of the data store 120, and their integrity is maintained whenever there is a change to the fundamental data items from which they are computed. To accomplish this the data store 120 may makes use of "Incremental View Maintenance" techniques, allowing it to make precise updates to the values of materialized derived data items when relevant fundamental data items change. It should be noted, however, that derived data items may not be materialized in other embodiments. Instead, they may be computed on the fly. Further, in other embodiments, some derived data items may be materialized some of the time, while others are not materialized.

At this point, a user opens her web browser 170 running on her client computer 150, described above with respect to FIG. 1j, and accesses the execution environment 110 executing on the server computing device 140. The user navigates to a product page for the "Cola" product in the point-of-sale application 130a using the browser URL "http://mysample-app.com/point-of-sale/product/cola". This results in an initial input user interface request 181, associated with the derived "Product" data item 122a1 representing the "Cola" product.

In this example, the request is sent from the user's web browser 170, via a computer network to the execution environment 110. In one embodiment, the user interface request orchestrator 111 stores the request in a "request queue" of requests used to automatically generated complementary requests targeting applications other than the point-of-sale application 130a.

It should be appreciated that while this example describes a user accessing the execution environment 110 using a web browser 170 running on a client computing device 150, other means of access are contemplated by the scope of this disclosure. For example, the user may instead access the execution environment 110 using custom software installed on her client device, or she may physically access the server computing device 140, etc.

At block 513, the execution environment 110 receives request information about request 181 associated with the derived "Product" data item 122a1. The request is for the user interface 160a1 and is targeting the point-of-sale application 130a.

In this example, the initial user interface request 181 is received by the execution environment 110, which uses the CREATE REQUEST FORMAT statements in translation information 132a to learn that the request is associated with the "Product" data item 122a1. It then forwards request 181 to the point-of-sale application 130a as request 181a1. Thus, the execution environment 110 receives all information it needs about the request. However, in other examples, applications may directly receive requests and only inform the execution environment about those requests. The request orchestrator 111 of the execution environment 110 will later in this example use the request information to determine which complementary requests should be generated to collect user interfaces related to the "Cola" product from other applications.

The point-of-sale application 130a processes the forwarded request 181a1 in a request handler. From the URL "http://mysampleapp.com/point-of-sale/product/cola" in the browser request, the handler receives the path "/point-of-sale/product/cola" from which it extracts the string "Cola" and passes it on to a C # function.

```
Handle.GET("/point-of-sale/product/{?}", "big",
    (HttpRequest scope, request, string descr ) =>
        HandleProductRequest(scope,descr,size) );
```

The HandleProductRequest is run in the context of a first isolated interaction scope such that it later can update values of data items related to the "Product" data item. In some embodiments, the interaction scope may be initiated explicitly and may or may not be isolated.

The descr variable represents the value of the "Product.Descr" data item 122a3 related to the "Product" data item 122a1. The application issues an SQL query to find the related "Product" data item:

```
Product product = Sql.GetFirst<Product>(
    "SELECT p FROM Product p WHERE p.Descr=?", descr);
```

In this example, the execution environment 110 may push updated data related to user interfaces rendered on the web browser 170 in addition to the traditional request/response pattern of web applications. In this example, this is accomplished using a bidirectional WebSocket connection 141 established between the web browser 170 and the execution environment 110. However, in some embodiments, other means of communicating changes may be used.

The application 130a binds data items to HTML elements using a "view model". Thus, the view model associates a data item with an HTML element such that the browser DOM can be updated when the execution environment 110 pushes updates to the user interfaces resulting from changes to the value of the data item.

It should be appreciated that view models may not be used in some embodiments. Instead, any suitable mechanism for associating data items with user interfaces comprising representations of their values may be used, in various embodiments.

The request handler of application 130a creates a new view model associated with the first interaction scope, ensuring that any data item access of the view model is done in that interaction scope. It then binds the view model to the "Product.Barcode" data item 122a2 related to the "Product" data item 122a1 associated with the request 181a1. It also binds a "save" action in the view model to a function that commits the interaction scope provided by the execution environment 110. These bindings allow the HTML template to refer to the values of bound data items and actions from within the HTML code, as shown below.

```
ViewModel view = new ViewModel(scope);
view.BindDataItem( "barcode", ( ) => product.Barcode );
... additional bindings ...
view.BindAction( "save", ( ) => { scope.Commit( ); });
```

It then binds the HTML template, containing the user interface, to the view model. In this example, the HTML template from application 130a defines user interface 160a1, which includes a "Barcode" widget as well as a "Save" button used for committing the interaction scope. The syntax "{{item}}" is used to refer to values of data items and actions bound to the view model, as shown above.

```
view.BindHTML(@"
<template>
<div>
    <label for="barcode">Barcode</label>
    <x-barcode id="Barcode" value="{{barcode.value}}"></x-barcode>
    ... additional user interface elements ...
    <button id="save" onclick="{{save}}"/>Save</button>
</div>
</template>");
```

It should be appreciated that while HTML is used in this example, various embodiments according to this disclosure may use any suitable format for describing user interfaces. Furthermore, in some embodiments, user interface elements may not be graphical user interfaces (GUIs). For example, user interfaces may be audio, text, video, etc.

The request handler in the point-of-sale application 130a prepares the response 182a1 comprising the HTML template and a JSON object comprising the state of the view model and a location address such that the client can send input to the view model at a later stage in case the user updates the barcode value via the user interface:

```
{
    "barcode": {
        "value": "0000000001236",
        "location":"/point-of-sale/viewmodel/1"
    }
    ... additional bindings ...
}
```

In this example, in the event that the user inputs a value to a control bound to a view model, the browser may send a regular HTTP POST request to the view model using the "location" property as the path. I.e. the view model value becomes a standard representational state transfer ("REST") resource such as a "resource" in the HTTP context. Also in this example, the client and server can send POST messages using web sockets. This enables the server to send updated values to the client without the client having to constantly poll the server. In other embodiments, protocols such as "JSON-Patch" can be used to mirror the contents of the server side view models and the client side user interface. However, any suitable method of communicating user interfaces, user interface inputs and user interface updates may be used, in various embodiments.

To compute the JSON object representing the view model state in this example, the point-of-sale application 130a reads the value "0000000001236" of the bound "Product-.Barcode" data item 122a2 in the first interaction scope associated with the view model.

At block 514, the execution environment provides, to the application 130a, in the isolated interaction scope associated with the view model, the value "0000000001236" of the derived "Product.Barcode" data item 122a2 related to the derived "Product" data item 122a1. The value is computed by an "EAN13" mapping function using the initial value "123" of the fundamental "Vendible.Id" data item 122f12 related to the fundamental "Vendible" data item 122f11, as defined by the point-of-sale application 130a's translation information 132a.

Once the value for the bound "Product.Barcode" data item 122a2 has been provided, the point-of-sale application 130a stores it in the "barcode" property of the JSON object representing the view model state. The response 182a1, comprising the HTML template and the JSON object, is then provided to the execution environment 110 and buffered until all responses to complementary user interface requests have been received. The buffering of responses may allow a single combined response 182 to be outputted to the web browser 170. It should be appreciated, however, that some embodiments according to this disclosure may not buffer responses.

In this example, the initial input user interface request 181 is not formatted according to a format directly understood by the user interface request orchestrator 111. To determine which data item the request is associated with, the user interface request orchestrator 111 consults translation information 132a for application 130a, which request 181 is targeting. After finding a matching request format definition, the user interface request orchestrator 111 determines that user interface request 181 is associated with the derived "Product" data item 122a1. However, it should be noted that any suitable method for identifying the associated data item may be used, in different examples.

In accordance to the method of generating complementary user interface request outlined in the pseudocode previously, the user interface request orchestrator 111 now, in this example, determines that the derived "Product" data item 112a1 has an equality (identity function) mapping relationship with fundamental "Vendible" data item 112f11. Further, it determines that there is a derived "Unit" data item 122b1, belonging to the procurement application 130b, which is also in a mapping relationship with the fundamental "Vendible" data item 112f11. Using this information, the user interface request orchestrator 111 generates a complementary request 181b1, associated with the derived "Unit" data item 122b1 and targeting the procurement application 130b.

In order to determine the appropriate format of the complementary user interface request 181b1, the user interface request orchestrator consults translation information 132b for the procurement application 130b. It finds a matching request format definition for a URL template "/procurement/unit/{{Unit.SKU}}", from which it determines that request 181b1 should have the URL "/procurement/unit/123".

At block 515, the user interface request orchestrator 111 generates a complementary request 181b1 for a user interface 160b1 using request information about request 181, the mapping relationship between the derived "Product" data item 122a1 and the fundamental "Vendible" data item 122f11, and the mapping relationship between the derived "Unit" data item 122b1 and the same fundamental "Vendible" data item 122f11. The complementary request 181b1 is associated with the derived "Unit" data item 122b1.

At block 516, the execution environment 110 provides the complementary request 181b1 to the procurement application 130b. The procurement application 130b, written in the Python programming language, processes request 181b1 in the following "Unit" request handler, corresponding to the pseudo-code request handler 137b1 described above with respect to FIG. 1k.

```
@request_handler('/procurement/unit/{?}', size='big')
def handle_unit_request(scope, request, sku):
    ...
```

In this example, the request handler only listens to requests for the "Big" size. The size is, in this example, an abstract form factor. Also in this example, the execution environment assigns "Big" for web page requests. Later, if an application handler makes application-induced requests or function calls for nested child user interfaces, it may issue requests with smaller sizes, in order to avoid infinite recursion. In some embodiments, the execution environment may enforce the diminishing use of sizes in application induced user interface requests such that infinite recursion is guaranteed to be avoided. However, in some embodiments other means of diminishing results and methods of halting the recursion or iteration may be used. In this example, the sizes are given as the "Big", "Medium" and "Small" form factors. In other examples, sizes such as "Page", "SubPage", "Listing", "Row", "Inline" or the like could be used. In some embodiments, the size is a multidimensional context or some other complex structure. The size may, in various embodiments, be provided in the translation information. In some embodiments, the browser may be queried for information related to context and available size such that the application does not have to declare requested sizes. In addition, in some embodiments, the execution environment might provide the diminishing size form factor by heuristic or other methods. In various embodiments, a combination of the methods to provide size requirements may be used, such as for example aiding the application with size recursion safeguarding and browser size information.

When processing request 181*b*1, the handle_unit_request function runs in the context of the first interaction scope. The sku variable represents the value of the "Unit.SKU" data item 122*b*2 related to the "Unit" data item 122*b*1. The application issues an SQL query to find the related "Unit" data item:

```
unit = sql.get_first(
    "SELECT u FROM Unit u WHERE u.sku=?", sku);
```

The "Unit" request handler of application 130*b* creates a new view model associated with the first interaction scope. It then binds the view model to the "Unit.SKU" data item 122*b*2 related to the "Unit" data item 122*b*1 associated with the request 181*b*1.

```
view = ViewModel(scope)
view.bind_data_item("SKU", lambda: unit.sku)
view.bind_action("save", lambda: scope.commit( ))
```

It then binds the HTML template, containing the user interface, to the view model.

```
view.bind_html(@"
<template>
<div>
    <label for="SKU">SKU</label>
    <input type="text" id="SKU" value="{{SKU.value}}">
    <button id="save" onclick="{{save}}">Save</button>
</div>
</template>")
```

The "Unit" request handler of application 130*b* then goes on to request the "Supply" user interface in accordance to the pseudo-code request handler 137*b*1 described above with respect to FIG. 1*k*.

```
responses = [ ]
for supply in sql.get(
    "SELECT s FROM Supply s WHERE s.Unit=?", unit ):
    response = self.request(
        "/procurement/supply/" + unit.key, "medium" )
    responses.append(response)
```

In this example, the self.request( ) function, which issues application-induced requests, includes functionality for providing information to the execution environment 110 by notifying the user interface request orchestrator 111 of the requests it makes. This allows the user interface request orchestrator 111 to generate complementary requests. Furthermore, in some embodiments, complementary requests generated from an application-induced request may result in further application-induced requests, and so on, recursively, until a termination criterion is met. As the request handlers for the application induced requests are internal to the procurement application 130*b*, the requests are issued as regular Python function calls and are consequently synchronous. However, in some embodiments other means of submitting requests may be used such as asynchronous calls, IPC calls and other methods.

The "Supply" request handler of the procurement application 130*b* handles the application-induced supply requests in the following manner, corresponding to the pseudocode handler 137*b*2 of FIG. 1*k*:

```
@request_handler('/procurement/supply/{?}', size='medium')
def handle_supply_request(scope, request, key):
    supply = sql.get_first(
        "SELECT o FROM Supply o WHERE o.Key = ?", key)
    ... generate view model ...
    self.request( "/procurement/supplier/" +
            supply.supplier.key, "small")
    ... collect responses ...
    ... return combined view model and HTML ...
```

The above request handler issues further application-induced "Supplier" requests, handled by the following code corresponding to the pseudocode handler 137*b*3 of FIG. 1*k*:

```
@request_handler('/procurement/supplier/{?}', size='small')
def handle_supplier_request(scope, request, key):
    ... generate and return view model and HTML ...
```

At this point, all application-induced requests initiated by the "Unit" request handler of application 130*b* have been processed and had their responses, comprising combined view models and HTML templates, collected by the "Unit" request handler. The "Unit" request handler constructs a JSON object representing the combined view model states of its own view model, and the view models produced by its application-induced requests. Similarly, it constructs a combined HTML template containing its own HTML template and the HTML templates produced by the application-induced requests.

The "Unit" request handler then prepares a response 182*b*1 comprising the combined HTML template and the JSON object containing the combined view model state. The combined view model state includes a location address such that the web browser 170 can push input to the view model at a later stage in case the user changes the values in, for example, "SKU" text input element.

To compute the JSON object representing the combined view model state, the procurement application 130*b* reads the value "123" of the bound "SKU" data item in the first interaction scope.

At block 517, the execution environment provides, to the procurement application 130*b* and in the first interaction scope, the value "123" of the derived "Unit.SKU" data item 122*b*2 related to the derived "Unit" data item 122*b*1. The value is computed by an identity mapping function using the initial value "123" of the fundamental "Vendible.Id" data item 122*f*12 related to the fundamental "Vendible" data item 122*f*11, as defined by the procurement application 130*b*'s translation information 132*b*.

Once the value for the bound "Unit.SKU" data item 122*b*2 has been provided to the procurement application 130*b*, it is stored in the "sku" property of the JSON object representing the view model state. The procurement application 130*b* then delivers the response 182*b*1 to the execution environment 110.

Using the information provided by the procurement application 130*b* about the application-induced requests associated with the "Supplier" data items 122*b*11 and 122*b*13, the user interface request orchestrator 111 generates two more complementary requests 181*c*1 and 181*c*2, associated with the derived "Person" data items 122*c*1 and 122*c*4, respectively. The complementary requests could, in this example, be generated as the "Person" and "Supplier" data items are in mapping relationships via fundamental "Agent" data items in this example.

The contact management application 130c processes user interface requests 181c1 and 181c2 in a similar fashion to the request handling logic described above with respect to applications 130a-b, and provides two responses 182c1 and 182c2, respectively, each comprising an HTML template and a JSON object representing the view model state.

Since the execution environment 110 has received responses for all of the requests 181a1, 181b1, 181c1, and 181c2 that it issued to applications 130a-c, and since the user interface request orchestrator 111 has not generated any more complementary requests, the execution environment 110 combines the individual responses 182a1, 182b1, 182c1 and 182c2 into a single response 182.

In this example, the combined JSON will look like followings. In other embodiments and examples, the combination may use different representations.

```
{
    "/point-of-sale/product/cola": {
        "Barcode": {
            "value": "0000000001236",
            "location": "/point-of-sale/viewmodel/1"
        }
        ... additional bindings ...
    },
    "/procurement/unit/123": {
        "SKU": {
            "value": "123",
            "location": "/procurement/viewmodel/2"
        }
    },
    "/procurement/supply/13": {
        "price": {
            "value": "8",
            "location": "/procurement/viewmodel/3"
        }
    },
    "/procurement/supply/12": {
        "price": {
            "value": "2",
            "location": "/procurement/viewmodel/4"
        }
    }
    "/procurement/supplier/14": {
        "name": {
            "value": "Me",
            "location": "/procurement/viewmodel/5"
        }
    },
    "/procurement/supplier/15": {
        "name": {
            "value": "John",
            "location": "/procurement/viewmodel/6"
        }
    },
    "/contact/person/me": {
        ... bindings ...
    },
    "/contact/person/john": {
        ... bindings ...
    }
}
```

The combined HTML template is in this example merely a concatenation of the individual responses' HTML templates. However, in some embodiments, other methods of combining markup language or other UI representations may be employed. For example, using HTML based template frameworks may require special formatting or embeddings.

The execution environment, in this example, then transmits the combined response to the user's web browser 170. It should be noted, however, that in some embodiments, the execution environment 110 may transmit responses individually, without buffering or combining them.

At block 518, the execution environment 110 outputs the first user interface 160a1 comprising a "Barcode" element with a representation of the value "0000000001236" of the "Product.Barcode" data item 122a2, and the second user interface 160b1 comprising an "SKU input" element with a representation of the value "123" of the "Unit.SKU" data item 122b2. The user interfaces 160a1 and 160b1 are outputted as part of the combined response 182 described above.

The user's web browser 170 receives the combined response 182. In this example, the response 182 contains an HTML template combined from the HTML templates of responses 182a1, 182b1, 182c1 and 182c2, and also a JSON object representing the combined view model state from the same responses.

In this example, the user's web browser 170 renders the user interface elements in the combined HTML template, replacing template bindings, as for example "{{barcode.value}}" with the corresponding values taken from the JSON object representing the combined view model state.

In some embodiments, the combination of user interfaces may involve the use of Cascading Style Sheets (CSS) and shadow-dom slots. In such embodiments, HTML elements may be blended such that they are mixed together in the same browser tab or window. Furthermore, in some embodiments, end-user WYSIWYG editors or other layout methods are employed such that he user can move elements around and change ordering, sizing and layout of the combined user interface including hiding or removing unwanted user interface elements. However, it should be appreciated that any suitable methods of combining, arranging and rearranging user interface elements may be used, in various embodiments. For example, the user may hide the redundant "Name" user interface element in relation to the "Supplier" user interface as it is somewhat redundant as the "Person" user interface also renders the same "Name" value.

While this example separates the template of the user interfaces from the values presented therein, other examples according to this disclosure may not make such a separation. For example, the execution environment 110 may output a combined response 182 containing a rendered version of the combined HTML template, in which the bindings have been substituted for their values.

At this point, the user can see the "Barcode" widget, containing the value "0000000001236", and the "SKU" text input element, containing the value "123", as well as the two "Save" buttons, etc., on the screen of her computing device 150. Dissatisfied with the current state, she highlights the "Barcode" widget and changes its value by scanning a new barcode "0000000012348" with her barcode scanner. Since the value of the "Barcode" widget is bound to the view model using the "{{barcode.value}}" notation in the HTML template, the "value" property of the "barcode" property in the JSON object representing the combined state of the view models is updated with the new value "0000000012348".

In this example the user's web browser 170 executes JavaScript code, provided by the execution environment 110, that listens to update events to the JSON object representing the combined view model state. The JavaScript code transmits the changes to the execution environment 110 using a POST request such that the application can perform the changes to the corresponding data items, e.g. when the user updates the barcode in the "Barcode" widget, the browser sends a value update request to the execution environment targeting the view model created by the point of sale application. In this example, the POST request has the following format:

```
POST /point-of-sale/view-models/1 HTTP/1.1
Host: mysampleapp.com
0000000012348
```

In this example, the view model is bound to the "Product.Barcode" data item 122a2. Upon receiving the user input, the point-of-sales application 130a updates the "Product.Barcode" data item 122a2 with the new value "0000000012348" originating from the user's input in the "Barcode" widget.

At block 519, the execution environment 110 receives the value "0000000012348" for the derived "Product.Barcode" data item 122a2 from the point-of-sale application 130a.

Since the "Product.Barcode" data item 122a2 is derived, its value cannot be updated directly in this example. Instead, the execution environment 110 consults translation information 132a to find the bidirectional mapping function used to compute and update the value of the "Product.Barcode" data item. Since bidirectional mapping functions are provided in the form of CREATE MAP statements expressed at the type level in this example, and since the updated "Product.Barcode" data item 122a2 is associated with the "Product" data item 122a1, the execution environment executes the "ON UPDATE OF Barcode . . ." portion of the CREATE MAP statement for the "Product" type, as shown above. This results in the following SQL statement being sent to the query engine 112:

```
UPDATE Vendible v
    SET v.Id = DecodeEAN13("0000000001236")
    WHERE v = DATAITEM(#key11);
```

To execute this statement, the query engine 112 begins by evaluating the DecodeEAN13( ) function with the value "0000000012348" as argument, resulting in the value "1234". The value "1234" is to be assigned to the "Vendible.Id" data item 122f12 related to the "Vendible" data item 122f11 (identified by "# key11") from which the "Product-.Barcode" data item 122a2 is computed.

At block 520, the execution environment 110 assigns, in the first interaction scope associated with the view model from the point-of-sale application 130a, the updated value "1234" to the "Vendible.Id" fundamental data item 122f12 computed using the value "0000000012348" just assigned to the "Product.Barcode" data item 122a2. The computation of the updated value "1234" is defined by translation information 132a, which contains the aforementioned CREATE MAP statement used to compute the value of the "Product" data item 122a1 and its related "Product.Barcode" data item 122a2.

After the update to the derived "Product.Barcode" data item 122a2 has been executed, as described above, the execution environment 110 determines that the data item is bound to the view models from both the point-of-sale application 130a, and the procurement application 130b. Consequently, the execution environment 110 recomputes the state of the view models by reading the values of all data items bound to it.

At block 521, the execution environment 110 provides, in the first interaction scope, the value "1234" of the derived "Unit.SKU" data item 122b2 computed using updated value "1234" of the fundamental "Vendible.Id" data item 122f12. The computation is defined by translation information 132b, which contains the identity mapping function used to compute the value of the derived "Unit.SKU" data item 122b2 from the fundamental "Vendible.Id" data item 122f12.

Since the "Unit.SKU" data item 122b2 has been updated, the execution environment 110 transmits the new value to the user's web browser 170 user browser as it is displaying a user interface comprising representations of the old "Unit.SKU" value "123". In this example, the execution environment prepares WebSocket message for the user browser containing the following update to the view model state:

```
{
    "target": "/procurement/viewmodel/2",
    "value": "1234"
}
```

At block 522, the execution environment updates the user interface 160a2 to comprise, as part of the "SKU" text input element, a representation of the new value "1234" of the "Unit.SKU" data item 122b2.

In this example, after the execution environment 110 has transmitted the WebSocket message above, the JavaScript code executing in the web browser 170 updates its combined view model state such that the user interface is updated using the template binding. Consequently, since the "SKU" text input element of user interface 160b1 is bound to the "sku.value" property, it is updated so that it contains the new value "1234".

The view model from the procurement application 132b, and by extension the "Barcode" widget, are updated in the same way. Thus, at this point in the example, the user can see her change to the "Barcode" widget "0000000012348" reflected in the "SKU" text input element as "1234".

At this point, a second user opens his web browser and navigates to the same product page in the point-of-sale application as the the first user is currently working in. The execution environment 110 receives information about the second user's initial input user interface request for the product page and processes it in the same fashion as it processed the first user's initial input request.

At block 523, the execution environment 110 initiates, while the first interaction scope is open, a second interaction scope. The second interaction scope is associated with the view models of the point-of-sale and procurement applications 130a-b belonging to the second user's session.

At block 524, the application handles the request in the same way as previously by asking the execution environment 110 to provide, in the second interaction scope, the value "123" of the derived "Unit.SKU" data item 122b2 computed using the initial value "123" of the fundamental "Vendible.Id" data item 122f12, the computation defined by translation information 132b, such that the value can be used to respond to the request of the second user. Again, the response comprises a combined HTML template and a new JSON object representing the new combined view model state such that the second user can view and update the "Cola" product.

Thus, since the second interaction scope, in which the second user is working, is isolated from the first interaction scope, in which the first user is working, the second user does not see the change made by the first user.

At this point the first user is finished with her changes. Accordingly, she presses the "Save" button from the point-of-sale application's user interface 160a1. Since the "Save" button is bound to the "save" action in the view model of the point-of-sale application 130a, the JavaScript code in the original user's web browser 170 transmits the action through a POST request, similar to that described above with respect to updating values in the view model. The point-of-sale application 130a handles the "save" action by requesting that the execution environment 110 commit the first interaction scope.

At block 525, the execution environment 110 commits the first interaction scope in response to the first user pressing the "Save" button. After the first interaction scope is committed, a third user opens his web browser and navigates to the same product page in the point-of-sale application as the the first and second user are currently working in. The execution environment 110 receives information about the third user's initial input user interface request for the product page and processes it in the same fashion as it processed the first and second users initial input requests.

At block 526, the execution environment 110 initiates, after the first interaction scope has been committed, a third interaction scope. The third interaction scope is associated with the view models of the point-of-sale and procurement applications 130a-b belonging to the third user's session.

At block 527, the application handles the request from the third user in the same way as previously by asking the execution environment 110 to provide, in the third interaction scope, the value of the derived "Product.Barcode" data item 122a2. Because the changes made in the first interaction scope have been committed, the value "0000000012348" of the derived "Product.Barcode" data item is computed using the updated value "1234" of the fundamental "Vendible.Id" data item 122f12, the computation defined by translation information 132a, such that the value can be used to respond to the request of the third user. Again, the response comprises combined HTML template and a new JSON object representing the new combined view model state such that the third user can view and update the "Cola" product.

Thus, since the third interaction scope, in which the third user is working, was initiated after committing the first interaction scope, in which the first user was working, the third user sees the change made by the first user.

In the above example, the method of generating complementary user interface requests comprises receiving translation information, such as translation information 132a-c and receiving one or more initial requests notifications, starting with an initial request notification, such as receiving a user interface request (e.g., the user interface request 181) originating from the users browser, as input notifications, to obtain additional request notifications in an recursive manner, with the additional request notifications acting as the input notifications for a next iteration, until no more additional request notifications are obtained, the obtaining of additional requests comprising: obtaining additional requests by generating complementary requests, such as the generated request for the "Unit" user interface targeting the procurement application and obtaining application induced requests; the generation of complementary requests comprising: finding related data items having mapping relationships with data items associated with the requests of the input notifications, such as the "Unit" data item 122b1 and the "Person" data items 122c1 and 122c4 as shown above; and generating additional requests for user interfaces associated with the related data items, such as the request for user interface for "Unit" data item 122b1 and the "Person" data items 122c1 and 122c4, the additional request targeting a applications associated with the related data items, such as the "Procurement" application targeted for the "Unit" data item 122b1 and the "Contact" application targeted for the "Person" data items 122c1 and 122c2; the obtaining of application induced requests comprising: receiving information about user interface requests generated by applications, such as the request orchestrator 111 getting notified about request via the self.request call during the handling of the requests pertaining of the input notifications, such as the handle_supply_request and handle_supplier_request_request handlers in the procurement application 130b.

In the above example, the combined user interface response is outputted including the user interfaces of the generated complementary requests by outputting the response to the users device running her browser.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
executing, by one or more processors of a computer system, an execution environment, the computer system comprising the one or more processors and a processor-addressable memory in communication with the one or more processors;
maintaining, by the computer system within the execution environment, a data store memory;
receiving, by the computing system within the execution environment, first translation information for a first application and second translation information for a second application, the first translation information defining a first mapping relationship between a first derived data item and a first fundamental data item, and the second translation information defining a second mapping relationship between a second derived data item and the first fundamental data item, the first and second derived data items formatted according to data models of the first and second application, respectively;
receiving, by the computing system within the execution environment, user interface request information about a user interface request targeting the first application for a first user interface, the user interface request associated with the first derived data item;
generating, by the computing system, a complementary request for a second user interface using at least the input user interface request information and the first and second mapping relationship, the complementary request associated with the second derived data item;

providing, by the computing system, the complementary request to the second application;

outputting the first user interface and the second user interface providing, in a first interaction scope, a first value of a third derived data item related to the first derived data item, the first value computed using at least an initial value of a second fundamental data item related to the first fundamental data item, the computation defined by the first translation information; and providing, in the first interaction scope, a second value of a fourth derived data item related to the second derived data item computed using at least the initial value of the second fundamental data item, the computation defined by the second translation information.

2. The method of claim 1, further comprising:
receiving, from the first application, a third value for the third derived data item;
assigning, in the first interaction scope, an updated value to the second fundamental data item computed using at least the third value, the computation defined by the first translation information; and
providing, in the first interaction scope, a fourth value of the fourth derived data item computed using at least the updated value of the second fundamental data item, the computation defined by the second translation information.

3. The method of claim 2, further comprising:
initiating, while the first interaction scope is open, a second interaction scope; and
providing, in the second interaction scope, a fifth value of the fourth derived data item computed using at least the initial value of the second fundamental data item, the computation defined by the second translation information.

4. The method of claim 3, further comprising:
committing the first interaction scope after providing the fifth value;
initiating, after committing the first interaction scope, a third interaction scope; and
providing, in the third interaction scope, a sixth value of the third derived data item computed using at least the updated value of the second fundamental data item, the computation defined by the first translation information.

5. The method of claim 1, further comprising materializing, in the data store memory, the first value of the third derived data item.

6. The method of claim 1, further comprising:
receiving a third value for the third derived data item;
assigning, in the first interaction scope, an updated value to the second fundamental data item computed using at least the third value, the computation defined by the first translation information;
providing, in the first interaction scope, a fourth value of the fourth derived data item computed using at least the updated value of the second fundamental data item, the computation defined by the second translation information; and
updating the second user interface to comprise a representation of the fourth value.

7. The method of claim 1, wherein the first application is process-isolated from the second application.

8. The method of claim 1, wherein the first or second translation information is separate from the first and second application.

9. The method of claim 1, wherein the data store memory is maintained in processor-addressable memory.

10. The method of claim 1, wherein the input user interface request is an application-induced request.

11. The method of claim 10, wherein the application-induced request is generated in response to a prior complementary request.

12. The method of claim 1, wherein the first user interface comprises a representation of a first value, and the second user interface comprises a representation of a second value.

13. The method of claim 1, further comprising:
receiving, by the computing system within the execution environment, first user interface information about a first user interface;
receiving, by the computing system within the execution environment, second user interface information from the second application; and
outputting a user interface comprising a combination of the first user interface and the second user interface based on the first and second user interface information.

14. A computing device comprising:
a non-transitory computer-readable medium; and
one or more processors communicatively coupled to the non-transitory computer-readable medium, the one or more processors configured to execute processor-executable instructions stored in the non-transitory computer-readable medium to:
execute an execution environment;
maintain a data store memory within the execution environment;
receive, within the execution environment, first translation information for a first application and second translation information for a second application, the first translation information defining a first mapping relationship between a first derived data item and a first fundamental data item, and the second translation information defining a second mapping relationship between a second derived data item and the first fundamental data item, the first and second derived data items formatted according to data models of the first and second application, respectively;
receive, within the execution environment, user interface request information about a user interface request targeting the first application for a first user interface, the user interface request associated with the first derived data item;
generate a complementary request for a second user interface using at least the user interface request information and the first and second mapping relationship, the complementary request associated with the second derived data item;
provide the complementary request to the second application;
output the first user interface and the second user interface;
provide, in a first interaction scope, a first value of a third derived data item related to the first derived data item, the first value computed using at least an initial value of a second fundamental data item related to the first fundamental data item, the computation defined by the first translation information; and
provide, in the first interaction scope, a second value of a fourth derived data item related to the second derived data item computed using at least the initial value of the second fundamental data item, the computation defined by the second translation information.

15. The computing device of claim 14, wherein the one or more processors are further configured to execute processor-executable instructions stored in the non-transitory computer-readable medium to:
- receive, from the first application, a third value for the third derived data item;
- assign, in the first interaction scope, an updated value to the second fundamental data item computed using at least the third value, the computation defined by the first translation information; and
- provide, in the first interaction scope, a fourth value of the fourth derived data item computed using at least the updated value of the second fundamental data item, the computation defined by the second translation information.

16. The computing device of claim 15, wherein the one or more processors are further configured to execute processor-executable instructions stored in the non-transitory computer-readable medium to:
- initiate, while the first interaction scope is open, a second interaction scope; and
- provide, in the second interaction scope, a fifth value of the fourth derived data item computed using at least the initial value of the second fundamental data item, the computation defined by the second translation information.

17. The computing device of claim 16, wherein the one or more processors are further configured to execute processor-executable instructions stored in the non-transitory computer-readable medium to:
- commit the first interaction scope after providing the fifth value;
- initiate, after committing the first interaction scope, a third interaction scope; and
- provide, in the third interaction scope, a sixth value of the third derived data item computed using at least the updated value of the second fundamental data item, the computation defined by the first translation information.

18. The computing device of claim 14, wherein the one or more processors are further configured to execute processor-executable instructions stored in the non-transitory computer-readable medium to materialize, in the data store memory, the first value of the third derived data item.

19. The computing device of claim 14, wherein the one or more processors are further configured to execute processor-executable instructions stored in the non-transitory computer-readable medium to:
- receive a third value for the third derived data item;
- assign, in the first interaction scope, an updated value to the second fundamental data item computed using at least the third value, the computation defined by the first translation information;
- provide, in the first interaction scope, a fourth value of the fourth derived data item computed using at least the updated value of the second fundamental data item, the computation defined by the second translation information; and
- updating the second user interface to comprise a representation of the fourth value.

20. The computing device of claim 14, further comprising:
- receive, within the execution environment, first user interface information about a first user interface;
- receive second user interface information from the second application; and
- output a user interface comprising a combination of the first user interface and the second user interface based on the first and second user interface information.

* * * * *